United States Patent
Loewen et al.

(10) Patent No.: US 12,094,617 B2
(45) Date of Patent: Sep. 17, 2024

(54) MULTISTAGE ANNULAR LINEAR INDUCTION PUMP FOR NUCLEAR REACTORS

(71) Applicant: GE-Hitachi Nuclear Energy Americas LLC, Wilmington, NC (US)

(72) Inventors: Eric Paul Loewen, Wilmington, NC (US); William Roysdon Murray, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 384 days.

(21) Appl. No.: 17/490,052

(22) Filed: Sep. 30, 2021

(65) Prior Publication Data

US 2023/0110459 A1    Apr. 13, 2023

(51) Int. Cl.
*H02K 44/06* (2006.01)
*G21C 15/247* (2006.01)
*G21C 19/04* (2006.01)

(52) U.S. Cl.
CPC .......... *G21C 15/247* (2013.01); *G21C 19/04* (2013.01); *H02K 44/06* (2013.01)

(58) Field of Classification Search
CPC .............................. G21C 15/247; G21C 19/04
See application file for complete search history.

(56) References Cited

U.S. PATENT DOCUMENTS

| | | |
|---|---|---|
| 4,765,948 A | 8/1988 | DeLuca et al. |
| 4,828,459 A | 5/1989 | Behrens |
| 4,859,885 A | 8/1989 | Kliman et al. |
| 5,415,529 A * | 5/1995 | Le Boucher ........... H02K 44/26 310/11 |
| 7,753,656 B2 | 7/2010 | Lemoff et al. |
| 11,049,624 B2 | 6/2021 | Loewen et al. |
| 2004/0234379 A1 | 11/2004 | Miner et al. |
| 2004/0234392 A1 | 11/2004 | Ghoshal et al. |

(Continued)

FOREIGN PATENT DOCUMENTS

| | | | |
|---|---|---|---|
| CN | 107231079 A | * 10/2017 | ............. H02K 44/06 |
| CN | 108123587 B | 4/2020 | |

OTHER PUBLICATIONS

English translation of CN-107231079-A obtained on Mar. 18, 2024 (Year: 2017).*

(Continued)

*Primary Examiner* — Connor J Tremarche
(74) *Attorney, Agent, or Firm* — Harness, Dickey & Pierce, P.L.C.

(57) ABSTRACT

A liquid metal-cooled nuclear reactor includes, within a reactor pressure vessel having a reactor core, a multistage annular linear induction pump (ALIP) configured to circulate liquid metal coolant through the reactor core. The multistage ALIP includes multiple sets of induction coils that at least partially define separate, respective stages of the multistage ALIP. The multiple sets of induction coils are configured to be electrically connected to separate, respective polyphase power supplies, such that the stages of the multistage ALIP are configured to be controlled independently of each other to adjustably control a flow of liquid metal coolant through the reactor core based on independent control of the multiple polyphase power supplies.

20 Claims, 12 Drawing Sheets

(56) References Cited

U.S. PATENT DOCUMENTS

2017/0162283 A1* 6/2017 Loewen ................ H02K 44/06

OTHER PUBLICATIONS

International Search Report and Written Opinion, dated Oct. 23, 2023, issued in corresponding International Patent Application No. PCT/US2022/044668.
Development of 160 m3/min Large Capacity Sodium-Immersed Self-Cooled Electromagnetic Pump, Journal of Nuclear Science and Technology, 41:4, 511-523, DOI: 10.1080/18811248.2004.9715514.
Abdullina, K. I., S. V. Bogovalov, and Yu P. Zaikov. "3D numerical modeling of liquid metal turbulent flow in an annular linear induction pump." *Annals of Nuclear Energy* 111 (2018): 118-126.
Leboucher, L., and D. Villani. "Slot design of optimized electromagnetic pump." IEEE *Transactions on magnetics* 29.6 (1993): 2953-2955.
International Preliminary Report on Patentability dated Apr. 2, 2024 for corresponding International Application No. PCT/US2022/044668.

* cited by examiner

MULTISTAGE ANNULAR LINEAR INDUCTION PUMP FOR NUCLEAR REACTORS

BACKGROUND

Field

The present disclosure relates in general to nuclear reactors and in particular to controlling liquid metal coolant circulation through a reactor core of a liquid metal-cooled nuclear reactor.

Description of Related Art

Nuclear reactors included in nuclear plants may be configured to be cooled via heat transfer to one or more coolants circulated through the core. Various coolants may be utilized to remove heat from the reactor core. A coolant may include one or more various substances, including water, liquid metal, molten salt, a gaseous substance, some combination thereof, etc.

In some nuclear plants, a coolant removing heat from a reactor core, also referred to herein as a primary coolant, is circulated through a heat exchanger to transfer the heat to another coolant, also referred to herein as a secondary coolant. In some cases, the secondary coolant is used to perform work, including driving an electrical generator via circulating through a turbine device included in the nuclear plant. In some nuclear plants, a coolant may be used to provide process heat to support one or more industrial processes, including desalination, hydrogen production, etc.

In some cases, a nuclear reactor is configured to be cooled by liquid metal circulation. Such a nuclear reactor is referred to herein interchangeably as a liquid metal-cooled nuclear reactor and may include a primary coolant loop via which one or more liquid metal substances are circulated as the primary coolant. Such one or more liquid metal substances circulating through the primary coolant loop may be circulated at least partially through a reactor core of the nuclear reactor and are referred to herein as liquid metal coolants.

In some cases, a liquid metal coolant that may be circulated through a nuclear reactor includes a conductive liquid metal substance. A liquid metal-cooled nuclear reactor configured to be cooled via a conductive liquid metal substance may include one or more electromagnetic pumps (EMPs) configured to circulate the conductive liquid metal coolant through the nuclear reactor.

SUMMARY

According to some example embodiments, a nuclear reactor configured to be cooled via liquid metal circulation may include a reactor pressure vessel, a reactor core within the reactor pressure vessel, and a multistage annular linear induction pump (ALIP) within the reactor pressure vessel. The multistage ALIP may be configured to circulate liquid metal coolant through a primary coolant flow path that includes the reactor core. The multistage ALIP may include a pump casing having a longitudinal axis extending in a longitudinal direction and at least partially defining an interior of the multistage ALIP, concentric annular walls extending coaxially with the longitudinal axis and collectively defining a flow annulus extending coaxially with the longitudinal axis, and a plurality of induction coils within the interior of the multistage ALIP, each induction coil surrounding the longitudinal axis. The plurality of induction coils may each have a central axis that is coaxial with the longitudinal axis. The plurality of induction coils may be spaced apart from each other in the longitudinal direction. The plurality of induction coils may include a plurality of sets of induction coils at least partially defining separate, respective stages of a plurality of stages of the multistage ALIP. The plurality of sets of induction coils may be to be electrically connected to separate, respective polyphase power supplies of a plurality of polyphase power supplies, such that the plurality of stages are configured to be controlled independently of each other to adjustably control a flow of liquid metal coolant through the primary coolant flow path based on independent control of the plurality of polyphase power supplies.

The plurality of sets of induction coils may include a first set of induction coils and a second set of induction coils. The first set of induction coils may at least partially define a first stage of the plurality of stages. The second set of induction coils may at least partially define a second stage of the plurality of stages.

The first and second sets of induction coils may be at least partially interlaced with each other in the longitudinal direction, such that at least one induction coil of the first set of induction coils is located between at least two induction coils of the second set of induction coils in the longitudinal direction.

The first and second sets of induction coils may be spaced apart from each other in the longitudinal direction, such that no induction coil of the first set of induction coils is located between at least two induction coils of the second set of induction coils in the longitudinal direction, and no induction coil of the second set of induction coils is located between at least two induction coils of the first set of induction coils in the longitudinal direction.

The first and second sets of induction coils may have different intrinsic properties. Said different intrinsic properties may include at least one of induction coil material composition, spacing in the longitudinal direction between opposing surfaces of adjacent induction coils of a same set of induction coils, induction coil thickness in the longitudinal direction, induction coil annular thickness in a radial direction that extends perpendicular to the longitudinal direction, induction coil inner radius, or induction coil outer radius.

At least two induction coils of a given set of induction coils of the plurality of sets of induction coils may have different intrinsic properties. Said different intrinsic properties may include at least one of induction coil material composition, spacing in the longitudinal direction between opposing surfaces of adjacent induction coils of a same set of induction coils, induction coil thickness in the longitudinal direction, induction coil annular thickness in a radial direction that extends perpendicular to the longitudinal direction, induction coil inner radius, or induction coil outer radius.

The multistage ALIP may further include a central core extending coaxially to the longitudinal axis and surrounded by the concentric annular walls. The plurality of stages may be further at least partially defined by variation in the longitudinal direction of at least one of a material composition of the central core, or a diameter of the central core in a radial direction that is perpendicular to the longitudinal direction.

The plurality of stages may be further at least partially defined by variation in the longitudinal direction of at least one of an outer diameter of an inner annular wall of the concentric annular walls, an inner diameter of an outer annular wall of the concentric annular walls, a thickness of at least one annular wall of the concentric annular walls, or a geometry of the flow annulus.

Each separate polyphase power supply may be configured to supply polyphase electrical power via a separate polyphase power cable of a plurality of polyphase power cables. The plurality of sets of induction coils may be electrically connected to separate, respective polyphase power cables of the plurality of polyphase power cables. The plurality of polyphase power cables may be at least partially enclosed within a single power supply conductor cable. The single power supply conductor cable may extend between at least the casing of the multistage ALIP and at least an exterior of the reactor pressure vessel via a single opening in an outer wall of the reactor pressure vessel, so that the plurality of sets of induction coils are electrically coupled to separate, respective polyphase power supplies via the single opening in the outer wall of the reactor pressure vessel.

The nuclear reactor may further include a control system configured to independently control the plurality of polyphase power supplies to independently control supplies of polyphase electrical power to each stage of the plurality of stages of the multistage ALIP, to adjustably control the flow of the liquid metal coolant through the primary coolant flow path.

According to some example embodiments, a multistage annular linear induction pump (ALIP) configured to circulate a liquid metal may include a pump casing having a longitudinal axis extending in a longitudinal direction and at least partially defining an interior of the multistage ALIP, concentric annular walls extending coaxially with the longitudinal axis and collectively defining a flow annulus extending coaxially with the longitudinal axis, and a plurality of induction coils within the interior of the multistage ALIP. Each induction coil may surround the longitudinal axis. The plurality of induction coils may each have a central axis that is coaxial with the longitudinal axis. The plurality of induction coils may be spaced apart from each other in the longitudinal direction. The plurality of induction coils may include a plurality of sets of induction coils. The plurality of sets of induction coils may at least partially define separate, respective stages of a plurality of stages of the multistage ALIP. The plurality of sets of induction coils may be configured to be electrically connected to separate, respective polyphase power supplies of a plurality of polyphase power supplies, such that the plurality of stages are configured to be controlled independently of each other to adjustably control a flow of the liquid metal through the flow annulus based on independent control of the plurality of polyphase power supplies.

The plurality of sets of induction coils may include a first set of induction coils and a second set of induction coils. The first set of induction coils may at least partially define a first stage of the plurality of stages. The second set of induction coils may at least partially define a second stage of the plurality of stages.

The first and second sets of induction coils may be at least partially interlaced with each other in the longitudinal direction, such that at least one induction coil of the first set of induction coils is located between at least two induction coils of the second set of induction coils in the longitudinal direction.

The first and second sets of induction coils may be spaced apart from each other in the longitudinal direction, such that no induction coil of the first set of induction coils is located between at least two induction coils of the second set of induction coils in the longitudinal direction, and no induction coil of the second set of induction coils is located between at least two induction coils of the first set of induction coils in the longitudinal direction.

The first and second sets of induction coils may have different intrinsic properties. Said different intrinsic properties may include at least one of induction coil material composition, spacing in the longitudinal direction between opposing surfaces of adjacent induction coils of a same set of induction coils, induction coil thickness in the longitudinal direction, induction coil annular thickness in a radial direction that extends perpendicular to the longitudinal direction, induction coil inner radius, or induction coil outer radius.

At least two induction coils of a given set of induction coils of the plurality of sets of induction coils may have different intrinsic properties. Said different intrinsic properties may include at least one of induction coil material composition, spacing in the longitudinal direction between opposing surfaces of adjacent induction coils of a same set of induction coils, induction coil thickness in the longitudinal direction, induction coil annular thickness in a radial direction that extends perpendicular to the longitudinal direction, induction coil inner radius, or induction coil outer radius.

The multistage ALIP may further include includes a central core extending coaxially to the longitudinal axis and surrounded by the concentric annular walls. The plurality of stages may be further at least partially defined by variation in the longitudinal direction of at least one of a material composition of the central core, or a diameter of the central core in a radial direction that is perpendicular to the longitudinal direction.

The plurality of stages may be at least partially defined by variation in the longitudinal direction of at least one of an outer diameter of an inner annular wall of the concentric annular walls, an inner diameter of an outer annular wall of the concentric annular walls, or different thickness of at least one annular wall of the concentric annular walls.

According to some example embodiments, a method for operating the multistage ALIP may include supplying first polyphase electrical power to a first stage of the plurality of stages via a first polyphase power supply of the plurality of polyphase power supplies to cause liquid metal flow through the flow annulus, and independently controlling a separate supply of second polyphase electrical power to a second stage of the plurality of stages via a second polyphase power supply of the plurality of polyphase power supplies to adjustably control the flow of liquid metal through the flow annulus.

The independently controlling may include inhibiting the separate supply of the second polyphase electrical power to the second stage while maintaining the supply of the first polyphase electrical power to the first stage.

The independently controlling may include independently adjusting at least one of a frequency of the second polyphase electrical power that is supplied to the second stage, independently of a frequency of the first polyphase electrical power that is supplied to the first stage, or a current of the second polyphase electrical power that is supplied to the second stage, independently of a current of the first polyphase electrical power that is supplied to the first stage.

According to some example embodiments, a method for configuring a nuclear reactor to improve liquid metal coolant flow control in the nuclear reactor may include installing a multistage ALIP in a primary coolant loop in a nuclear reactor pressure of the nuclear reactor. The multistage ALIP may include a plurality of stages at least partially defined by separate, respective sets of induction coils that are configured to be electrically connected to separate, respective polyphase power supplies. The method may further include electrically connecting the plurality of stages of the multistage ALIP to the separate, respective polyphase power supplies via separate, respective polyphase power cables. The method may further include communicatively coupling the multistage ALIP to an electromagnetic pump control system, the electromagnetic pump control system including a memory storing a program of instructions and a processor configured to execute the program of instructions to independently control each stage of the plurality of stages based on independently controlling polyphase electrical power supplied by the separate, respective polyphase power supplies.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
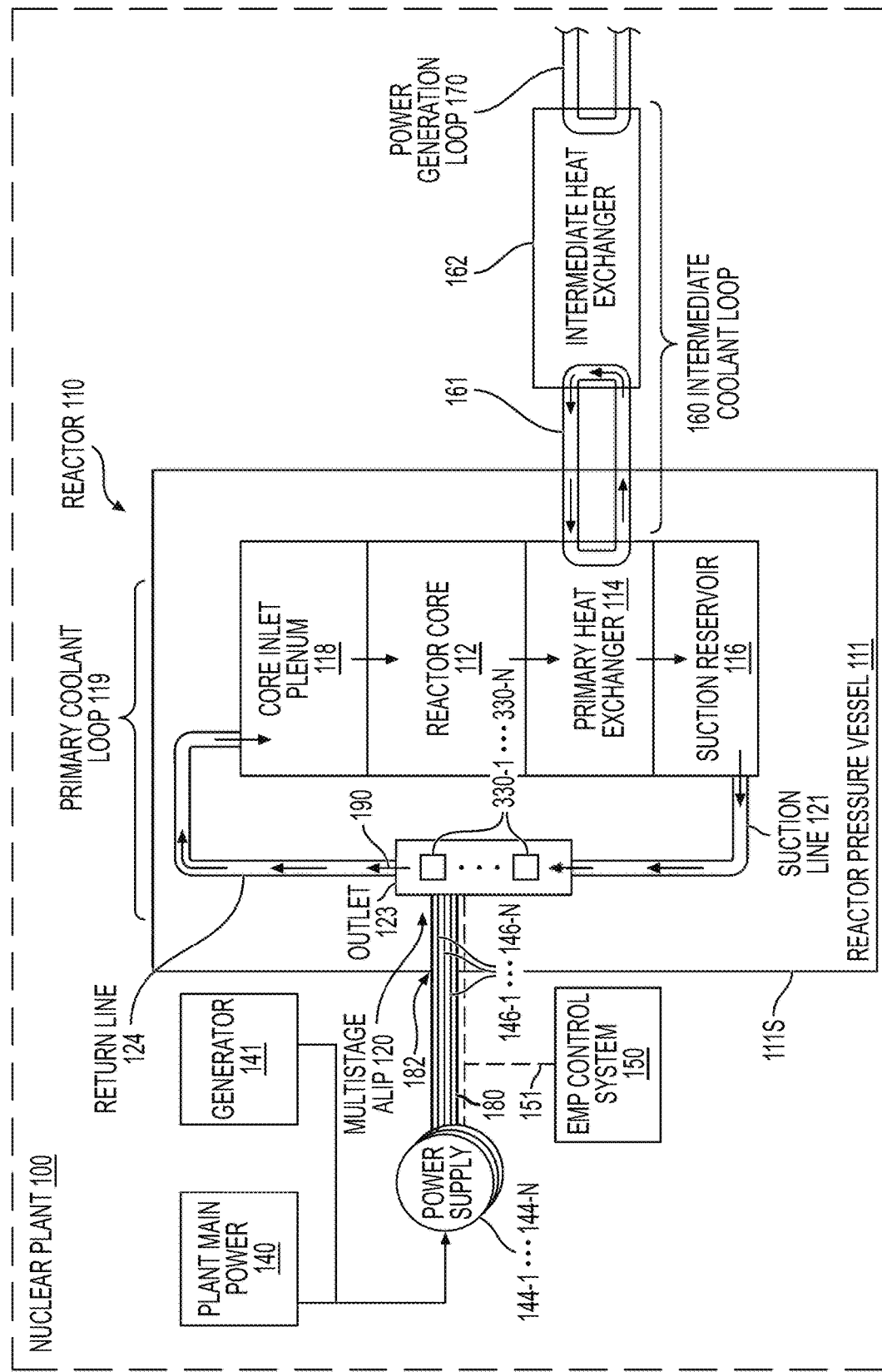
FIG. 1 is a schematic view of a nuclear plant that includes a liquid metal-cooled nuclear reactor, according to some example embodiments.

Reference will now be made in detail to example embodiments, some of which are illustrated in the accompanying drawings, wherein like reference labels refer to like elements throughout.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Units, systems, and/or devices according to one or more example embodiments may be implemented using one or more instances of hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The inventive concepts relate to electromagnetic pumps (EMPs) configured to provide improved control of liquid metal coolant flow through at least a portion of a nuclear reactor, liquid metal-cooled nuclear reactors including one or more of the electromagnetic pumps, and methods of configuring and/or operating the electromagnetic pumps and/or nuclear reactors.

The electromagnetic pumps according to some example embodiments of the inventive concepts include an Annular Linear Induction Pump (ALIP). An Annular Linear Induction Pump (ALIP) may be an electromagnetic pump that is configured to pump liquid metals based on applying electromagnetic forces on a liquid metal coolant to cause the liquid metal coolant to flow through the length (e.g., in parallel with the longitudinal axis) of the pump. This may be performed based on applying AC current at specified AC frequencies and phase angles to induction coils of the ALIP that surround a flow annulus that extends along the length of the pump (e.g., coaxially with the longitudinal axis of the pump).

In some example embodiments, the ALIP is a multistage ALIP that includes two or more "stages" and is configured, based on including the two or more stages, to enable improved flexibility of control of the flow of liquid metal coolant through the pump, and thus through a nuclear reactor that includes the pump. The performance (e.g., efficiency and/or pressure output) of an electromagnetic pump is based on a multitude of factors, including component geometry, applied frequency and/or power amplitude of electrical power to induction coils, material selection, and inlet flow conditions. A multistage ALIP contains two or more stages that may each independently vary some or all of these parameters to facilitate more economic (e.g., more efficient, more optimized according to cooling requirements of the nuclear reactor, etc.) liquid metal coolant flow for a liquid metal cooled system. Accordingly, a multistage ALIP provides an increased range of operating states and functions within a same operating envelope (e.g., an improved range of discrete flow rates that may be achieved by the multistage ALIP in comparison to a single-stage ALIP).

As described herein, a given "stage" of the multistage ALIP may refer to and/or be at least partially defined by a distinct set of induction coils, of the plurality of induction coils in the multistage ALIP, that are configured to be electrically connected to a separate, particular polyphase power supply. Accordingly, a plurality of stages in the multistage ALIP will be understood to refer to and/or be at least partially defined by separate, respective sets of induction coils that are configured to be electrically connected to separate, respective polyphase power supplies of a plurality of polyphase power supplies, such that the plurality of stages are configured to be controlled independently of each other, based on independent control of the plurality of polyphase power supplies, to adjustably control a flow of liquid metal coolant through the primary coolant flow path.

A stage, in addition to including and/or being at least partially defined by a particular set of induction coils configured to be electrically connected to a particular polyphase power supply, may include and/or may be at least partially defined by a particular configuration of the structural geometry of components of the multistage ALIP within at least a certain portion of the multistage ALIP. Such structural geometry of components may include thicknesses, lengths, widths, or the like of certain components, spacing distances between adjacent components of a particular set of components (e.g., spacing between adjacent induction coils along the length of the pump), channel geometry defined by one or more structures in the multistage ALIP (e.g., a flow channel that is a smooth annulus or a helical annulus as defined by the shape and/or structure of structures that define the flow channel), and the like. Accordingly, a plurality of stages in the multistage ALIP may include and/or may be at least partially defined by multiple, separate sections, regions, or the like in the multistage ALIP that have components with separate, respective structural geometries. For example, separate sets of induction coils in separate stages of a multistage ALIP may have different thicknesses in the longitudinal direction, different lengths or thicknesses in a radial direction of the pump, different spacing distances in the longitudinal direction between longitudinally adjacent induction coils within the same stage, or the like. In another example, a multistage ALIP may have an annular wall that at least partially defines the annular flow channel of the multistage ALIP, where the annular wall has separate portions having different inner diameters, different outer diameters, different thicknesses, or different shapes so as to define different geometries of the flow annulus (e.g., smooth annulus or helical annulus) in separate regions of the pump associated with separate, respective stages of the multistage ALIP (e.g., may be located in separate regions that are at least partially defined by separate, respective sets of induction coils configured to be electrically connected to separate polyphase power supplies). In another example, a multistage ALIP may have a central core, where the central core has separate portions having different thicknesses in the radial direction, and these separate portions may be understood to be associated with separate, respective stages of the multistage ALIP (e.g., may be located in separate regions that are at least partially defined by separate, respective sets of induction coils configured to be electrically connected to separate polyphase power supplies).

A stage, in addition to including and/or being at least partially defined by a particular set of induction coils configured to be electrically connected to a particular polyphase power supply, may include and/or may be at least partially defined by a distinct material composition and/or intrinsic property of one or more components of the multistage ALIP within at least a certain portion of the multistage ALIP. For example, separate sets of induction coils of a separate stages of a multistage ALIP may different material compositions. In another example, a multistage ALIP may have a central core, where the central core has separate sections having different material compositions, and these separate portions may be understood to be associated with separate, respective stages of the multistage ALIP (e.g., may be located in separate regions that are at least partially defined by separate, respective sets of induction coils configured to be electrically connected to separate polyphase power supplies).

It will be understood that a multistage ALIP according to any of the example embodiments may provide additional design variables via which pressure rise and/or flow of liquid metal coolant in the multistage ALIP may be controlled and/or adjusted, including varying the phases of the induction coils of the multistage ALIP, varying induction coil geometry and spacing of the induction coils of the multistage ALIP, varying materials used in each component between and/or within separate stages of the multistage ALIP, varying thickness of annular walls, and/or varying any of the above along a length of the multistage ALIP. Additionally, a multistage ALIP may be configured to provide control variables based on independently controlling and/or adjusting the operation of separate stages (including separate sets of induction coils) based on independently controlling (e.g., initiating or inhibiting) and/or adjusting parameters (e.g., frequency and/or power amplitude) of the supply of polyphase electrical power to separate stages of induction coils.

It will be understood that, in a multistage ALIP where different stages of the can be controlled, configured, adjusted, initiated (e.g., turned on), and/or inhibited (e.g., shut down) independently of one another, the inclusion of multiple such stages in a single pump may expands the design space significantly, as all of the parameters listed above which may be varied to control pressure rise and/or flow of liquid metal coolant may be multiplied by the number (e.g., quantity) of stages in the multistage ALIP, and may or may not be dependent on the interaction (or lack of interaction) between stages within a single multistage ALIP.

It will be understood that a multistage ALIP may enable improved operational flexibility provided by the multistage ALIP with regard to controlling and/or adjusting liquid metal coolant flow based on providing additional design and control variables. A multistage ALIP may be configured to provide better control of liquid metal coolant flow at low flow rates based on being configured to gradually ramp up inlet flow velocity through the length of the ALIP in different stages, for example based on independently controlling (e.g., turning on or shutting off) separate stages to operate in different operation modes. A multistage ALIP may be configured to adjust any of the above-noted variables to reduce slip to increase the pumping efficiency and/or to have higher pump pressure and efficiency.

A multistage ALIP may be configured to have varied induction coil geometry (e.g., dimensions) in separate stages and/or within a single stage to be configured to provide greater control sensitivity with regard to flow rate and/or pressure rise control at very high or very low flow rates of liquid metal coolant induced by the multistage ALIP.

A multistage ALIP may be configured to have independently controllable stages that may have their own frequency, current, and/or voltage of applied polyphase electrical power as deemed appropriate for the flow of liquid metal coolant in the separate sections of the pump corresponding to the respective stages. Such control may include independently turning on or turning off different pump stages if desired.

A multistage ALIP having multiple stages, for example where the multiple stages are at least partially arranged sequentially along a longitudinal direction of the multistage ALIP, may be configured to have second and subsequent stages that have more optimized geometries (e.g., dimensions) since the liquid metal coolant flowing along the longitudinal direction of the pump may be already in motion as induced by the first stage in the sequential arrangement from the pump inlet. As a result, the multistage ALIP may be configured such that the subsequent stages in the sequential arrangement from the inlet are configured to be .used for low flow rates of liquid metal coolant during system maintenance operating modes of the multistage ALIP and/or of a nuclear reactor in which the multistage ALIP is included.

Figure 4:
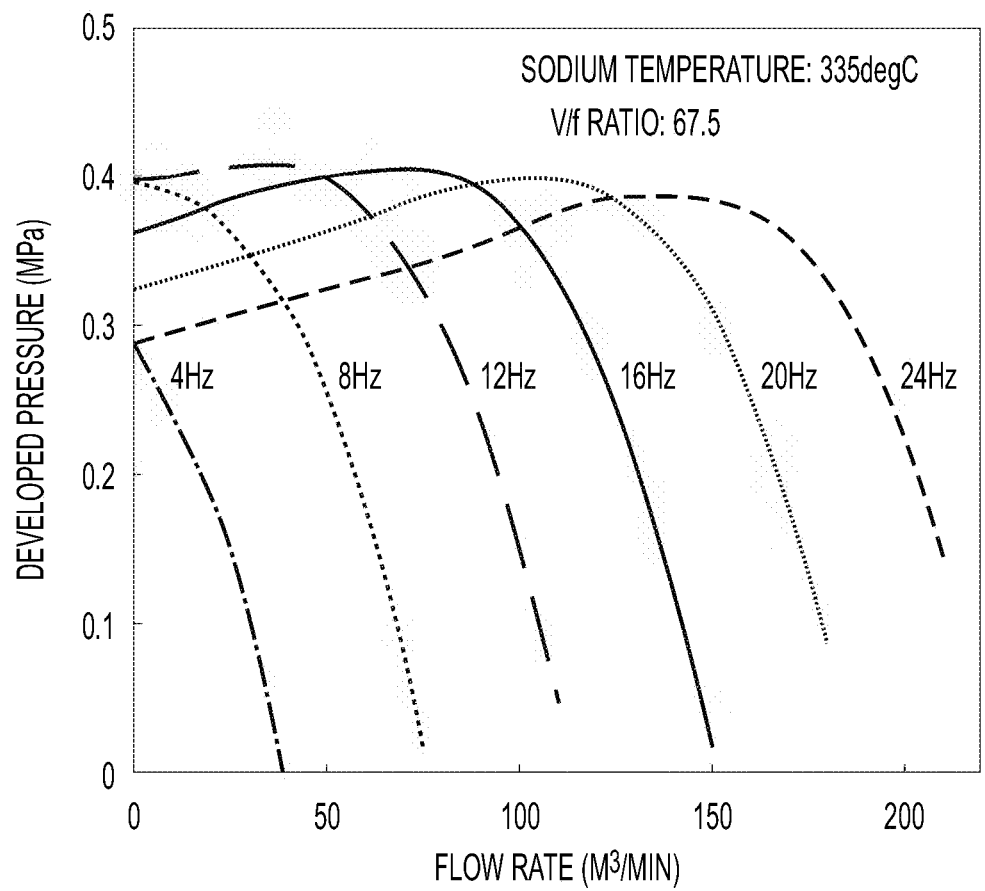
FIG. 4 is a graph showing performance of an ALIP based on electrical power supplied to induction coils of the ALIP, according to some example embodiments.

For example, FIG. 4 illustrates that the applied pressure at very low flow rates (such as during startup or shutdown) may be limited by the lowest available operating frequency of electrical power supplied to the pump. Allowing for multiple stages in the ALIP that are independently designed and/or configured to be independently controlled may configure the multistage ALIP to provide more precise pump control under low-flow conditions. Low flow conditions may be used during maintenance conditions and/or system standby heating conditions. Additionally, changing frequencies of polyphase electrical power supplied to a single-stage pump may provide a distinct jump in applied pressure at a given inlet flow rate, for example as shown in FIG. 4. A multistage ALIP may be configured to allow for smaller jumps in applied pressure when frequencies of polyphase electrical power supplied to one or more stages thereof are changed, thereby improving operational performance and/or efficiency of the multistage ALIP and/or a nuclear reactor including the multistage ALIP.

It will be understood that a multistage ALIP may provide improved control of liquid metal coolant flow at lower flow rates that may be important during startup and shutdown procedures associated with a nuclear reactor (e.g., reactor startup and/or shutdown). Additionally, a multistage ALIP may provide increased general operational flexibility when the pump pressure is to be changed.

It will be understood that a multistage ALIP may be configured to consume less power than a single-stage ALIP configured to induce a similar maximum flow rate of liquid metal coolant, because each pump stage may be configured to operating more effectively based on independent control (e.g., independently controlled supplies of electrical power to separate stages) and/or independently configured design variables (e.g., component geometry and/or composition). A multistage ALIP in a nuclear reactor may be configured to produce higher pressures than a similarly-sized single-stage ALIP, thereby supporting higher core power density and reducing capital costs associated with a nuclear reactor. A multistage ALIP may be configured to provide additional operational modes (e.g., a low flow option) for maintenance or keep-warm system functions, in comparison to a single-stage ALIP. A multistage ALIP in a nuclear reactor may be configured to enable reduced reactor startup times associated with startup of the nuclear reactor based on the improved operational flexibility and/or performance.

FIG. 1 is a schematic view of a nuclear plant that includes a liquid metal-cooled nuclear reactor, according to some example embodiments.

The nuclear plant 100 includes a liquid metal-cooled nuclear reactor (referred to herein as simply a "nuclear reactor") 110, a primary coolant loop 119, an intermediate coolant loop 160, a set of "N" polyphase power supplies 144-1 to 144-N (N being any positive integer equal to or greater than one), and an EMP control system 150. The primary coolant loop 119 includes at least one multistage ALIP 120 having "N" stages 330-1 to 330-N that are electrically connected to separate, respective polyphase power supplies of the N polyphase power supplies 144-1 to 144-N via separate, respective polyphase power cables 146-1 to 146-N (also referred to herein as power conductors, power wires, etc.) configured to supply polyphase power.

The nuclear reactor 110 includes a nuclear reactor pressure vessel 111. The nuclear reactor pressure vessel 111 includes a nuclear reactor core 112 and multiple components within a volume space at least partially defined by an outer wall 111S. The multiple components comprise a primary coolant loop 119. The primary coolant loop 119 may be configured to remove heat generated at the core 112 as a result of nuclear reactions within the nuclear reactor core 112. The primary coolant loop 119 illustrated in FIG. 1 is configured to circulate a liquid metal coolant 190 through at least a portion of the nuclear reactor core 112 to remove, from the nuclear reactor core 112, heat generated at the nuclear reactor core 112 as a result of nuclear reactions within the nuclear reactor core 112. Such heat removal may also be referred to herein as core heat rejection.

As shown, the primary coolant loop 119 includes a primary heat exchanger 114. The primary heat exchanger 114 is configured to transfer heat from the liquid metal coolant 190 exiting the nuclear reactor core 112 to another coolant. The other coolant circulates through an intermediate coolant loop 160. The other coolant, in some example embodiments, may include a liquid metal coolant. Liquid metal coolants circulating through the primary and intermediate coolant loops may be a common liquid metal substance or different liquid metal substances.

The primary coolant loop 119 includes a suction reservoir 116. The suction reservoir 116 is configured to receive liquid metal coolant 190 that leaves the primary heat exchanger 114 subsequent to the liquid metal coolant 190 transferring core-generated heat to the intermediate coolant loop 160.

The primary coolant loop 119 includes a multistage ALIP 120. The at least one multistage ALIP 120 is configured to operate to cause liquid metal coolant 190 to circulate through the nuclear reactor 110, as shown in FIG. 1. While FIG. 1 shows only one multistage ALIP 120 within the nuclear reactor 110, and the following description of FIG. 1 refers to "a" or "the" multistage ALIP 120, it will be understood that multiple multistage ALIPs 120 may be included within the nuclear reactor 110, where at least some of the multiple multistage ALIPs 120 may be configured to operate in parallel or in series with each other to circulate liquid metal coolant through the nuclear reactor, and each multistage ALIP 120 may be electrically connected a same or different combination of polyphase power supplies 144-1 to 144-N as the other multistage ALIPs 120 within the nuclear reactor.

The multistage ALIP 120 is coupled, at an intake orifice or inlet 122, to the suction reservoir 115 via a suction line 121. The multistage ALIP 120 is coupled, at an outlet orifice or outlet 123, to a core inlet plenum 118 via one or more return lines 124. The multistage ALIP 120 is configured to drive at least a portion of, or all of, the liquid metal coolant 109 to the core inlet plenum 118 and is further configured to generate at least a portion of, or all of, a pressure head, downstream of the at least one multistage ALIP 120. The pressure head may provide a driving force to circulate the liquid metal coolant through the core 112 as shown.

As shown, nuclear plant 100 includes "N" polyphase power supplies 144-1 to 144-N, where "N" is any positive integer equal to or greater than one. Each polyphase power supply 144-1 to 144-N may be any power supply or power source configured to supply polyphase electrical power (e.g., three phase AC power). Each polyphase power supply 144-1 to 144-N may be an AC power supply. For example, each polyphase power supply 144-1 to 144-N may be an adjustable speed drive, also called a variable speed drive, that is configured to receive AC ("alternating current") power at 60 Hz (e.g., from plant main power supply 140 and/or generator 141), convert the received AC power to DC ("direct current"), and then convert the power from DC to AC at a specific ("particular") current and frequency of polyphase electrical power to be supplied to a stage of the multistage ALIP 120.

As further shown, the polyphase power supplies 144-1 to 144-N are electrically coupled to one or more of a main power supply 140 of the nuclear plant 100 or a generator 141. In some example embodiments, the nuclear plant 100 includes one or more switchgear devices (not illustrated in FIG. 1) configured to selectively supply electrical power, to one or more power supplies 144-1 to 144-N, from one or more of the main power supply 140 or one or more generators 141. A generator 141 may include one or more of a combustion engine, a fuel cell device, a battery, an uninterruptible power supply (UPS), some combination thereof, etc. The plant main power supply 140 may include a power supply configured to supply power generated based on the process fluid circulating through the power generation loop 170.

In some example embodiments, where the multistage ALIP 120 includes N stages 330-1 to 330-N having separate, respective sets of induction coils configured to be electrically connected to separate, respective polyphase power supplies 144-1 to 144-N, the N polyphase power supplies 144-1 to 144-N may be electrically connected to separate, respective sets of induction coils corresponding to separate stages 330-1 to 330-N of the multistage ALIP 120 via separate, respective polyphase power cables 146-1 to 146-N (also referred to herein as "multi-wire power lines"). Each separate polyphase power cable 146-1 to 146-N may be configured to supply polyphase electrical power via a separate polyphase power cable 146-1 to 146-N. Each separate polyphase power cable 146-1 to 146-N may extend into the multistage ALIP 120 and may be separately electrically coupled a separate set of induction coils corresponding to and/or at least partially defining a separate stage 330-1 to 330-N of the multistage ALIP 120. Accordingly, the plurality of sets of induction coils that at least partially define the separate stages 330-1 to 330-1 of the multistage ALIP 120 may be electrically connected to separate, respective polyphase power cables 146-1 to 146-N of the plurality of polyphase power cables.

As shown in FIG. 1, the polyphase power cables 146-1 to 146-N may be collectively located in (e.g., at least partially or completely encased in, at least partially or completely enclosed in, or the like) a single power supply conductor 180 (also referred to herein as a "power supply conductor cable," "conduit," or "extension cable") that extends from the multistage ALIP 120 (e.g., at least a pump casing of the multistage ALIP 120) to at least an exterior of the nuclear reactor pressure vessel 111 through a single opening or "penetration" 182 in the outer wall 111S of the nuclear reactor pressure vessel 111, so that the plurality of sets of induction coils of the separate, respective stages 330-1 to 330-N of the multistage ALIP 120 may be electrically coupled to separate, respective polyphase power supplies 144-1 to 144-N via the single opening 182 in the outer wall 111S of the nuclear reactor pressure vessel 111. As a result, the electrical connection between the multistage ALIP within the nuclear reactor pressure vessel 111 and multiple polyphase power supplies 144-1 to 144-N outside of the nuclear reactor pressure vessel 111 may be accomplished with a single penetration 182 through the nuclear reactor pressure vessel 111 sidewall, thereby reducing complexity of the nuclear reactor 110 and improving containment performance of the nuclear reactor 110, in comparison to nuclear plants where multiple separate single-stage ALIPs are coupled between the suction line 121 and the return line 124 instead of a single multistage ALIP 120. Additionally, in example embodiments where a multistage ALIP 120 is used instead of multiple separate ALIPs coupled in series between the suction line 121 and the return line 124, the power supply conductor 180 enables reduction of electrical losses in the nuclear plant 100 due to the power supply conductor 180, coupling a single multistage ALIP 120 to at least an exterior of the nuclear reactor pressure vessel 111 having a shorter total length than one or more conductors that would be used to at least partially electrically connect multiple single-stage ALIPs to one or more polyphase power supplies 144-1 to 144-N.

While FIG. 1 illustrates the power supply conductor 180 extending through the opening 182 and further extending to the polyphase power supplies 144-1 to 144-N, it will be understood that the power supply conductor 180 may terminate at any point outside the nuclear reactor pressure vessel 111 between opening 182 and any of the polyphase power supplies 144-1 to 144-N, and the separate polyphase power cables 146-1 to 146-N may branch out of the termination end of the power supply conductor 180 and continue to extend independently from the end of the power supply conductor 180 to separate, respective polyphase power supplies 144-1 to 144-N.

The nuclear plant 100 includes an intermediate coolant loop 160. The intermediate coolant loop 160 includes a flow of coolant circulating through lines 161 between the primary heat exchanger 114 and an intermediate heat exchanger 162. The intermediate coolant loop 160 may transfer core-rejected heat from the liquid metal coolant 190 circulating through the primary coolant loop 119 to a process fluid circulating through the power generation loop 170 via heat transfer at the intermediate heat exchanger 162. In some example embodiments, the coolant circulating through the intermediate coolant loop includes a liquid metal coolant. The liquid metal coolant circulating through the intermediate coolant loop may be similar or different in composition relative to a liquid metal coolant 190 circulating through the primary coolant loop 119.

The nuclear plant 100 includes a power generation loop 170 configured to circulate a process fluid that receives heat from the intermediate coolant loop 160 via heat exchanger 162 and performs work, including driving a turbine. The turbine may operate an electrical power generator. The process fluid may include water in one or more various phases. In some example embodiments, the power generation loop 170 comprises a steam generator device in which the intermediate heat exchanger 162 is at least partially located, and the heat exchanger 162 is configured to transfer heat from the coolant circulating through the intermediate coolant loop 160 to water located in the steam generator to vaporize the water and generate steam. The generated steam may be used to perform work, including driving a turbine connected to an electrical generator to generate electrical power.

In some example embodiments, a nuclear reactor includes one or more control systems configured to monitor and/or control multistage ALIP 120 operation, including independently and/or adjustably controlling separate stages (e.g., separate sets of induction coils) within a given multistage ALIP 120 in order to adjustably control the flow of liquid metal coolant 190 within the nuclear reactor 110, the performance of the nuclear reactor 110, and/or the operational efficiency of the nuclear reactor 110. As shown in FIG. 1, the nuclear reactor 110 may include an EMP control system 150. The EMP control system 150 may be communicatively coupled 151, via one or more communication lines, power transmission lines, etc., to one or more of the polyphase power supplies 144-1 to 144-N. In some example embodiments, the EMP control system 150 may be communicatively coupled, via one or more communication lines, power transmission lines, etc., to one or more sensor devices (e.g., sensor 192, which may be one or more flowmeters such as one or more Venturi flow meters that may be configured to generate sensor data indicating a flow rate of liquid metal coolant 190 through the suction line 121, return line 124, and/or multistage ALIP 120, one or more pressure sensors that may be configured to generate sensor data indicating a pressure of liquid metal coolant 190 at one or more locations in the suction line 121, return line 124, and/or multistage ALIP 120, or the like) and/or devices within the nuclear reactor pressure vessel 111, including for example the multistage ALIP 120, but example embodiments are not limited thereto.

The EMP control system 150 may, in some example embodiments, be coupled to one or more sensor devices (e.g., sensor 192, which may be one or more flowmeters such as one or more Venturi flow meters that may be configured to generate sensor data indicating a flow rate of liquid metal coolant 190 through the suction line 121, return line 124, and/or multistage ALIP 120, one or more pressure sensors that may be configured to generate sensor data indicating a pressure of liquid metal coolant 190 at one or more locations in the suction line 121, return line 124, and/or multistage ALIP 120, or the like) configured to generate sensor data associated with one or more of the polyphase power supplies 144-1 to 144-N, the multistage ALIP 120, or the like.

The EMP control system 150 may monitor the operation of the multistage ALIP 120, based on monitoring information associated with one or more of the polyphase power supplies 144-1 to 144-N, one or more sensor devices (e.g., sensor 192, which may be one or more flowmeters such as one or more Venturi flow meters that may be configured to generate sensor data indicating a flow rate of liquid metal coolant 190 through the suction line 121, return line 124, and/or multistage ALIP 120, one or more pressure sensors that may be configured to generate sensor data indicating a pressure of liquid metal coolant 190 at one or more locations in the suction line 121, return line 124, and/or multistage ALIP 120, or the like), the multistage ALIP 120, etc. For example, the EMP control system 150 may receive sensor data generated by one or more sensor devices (e.g., sensor 192, which may be one or more flowmeters such as one or more Venturi flow meters that may be configured to generate sensor data indicating a flow rate of liquid metal coolant 190 through the suction line 121, return line 124, and/or multistage ALIP 120, one or more pressure sensors that may be configured to generate sensor data indicating a pressure of liquid metal coolant 190 at one or more locations in the suction line 121, return line 124, and/or multistage ALIP 120, or the like), where the sensor data may include information indicating a flow of electrical power from a given polyphase power supply 144-1 to 144-N to a given multistage ALIP 120. In another example, the EMP control system 150 may receive sensor data generated by one or more sensor devices (e.g., sensor 192, which may be one or more flowmeters such as one or more Venturi flow meters that may be configured to generate sensor data indicating a flow rate of liquid metal coolant 190 through the suction line 121, return line 124, and/or multistage ALIP 120, one or more pressure sensors that may be configured to generate sensor data indicating a pressure of liquid metal coolant 190 at one or more locations in the suction line 121, return line 124, and/or multistage ALIP 120, or the like), where the sensor data may include information indicating a strength of a magnetic field generated by one or more stages of a given multistage ALIP 120.

The EMP control system 150 may be configured to control operation of a multistage ALIP 120, for example to control the flow rate of liquid metal coolant through the multistage ALIP 120, based on independently controlling and/or adjusting the supplying of polyphase electrical power by one or more of the polyphase power supplies 144-1 to 144-N. For example, where the multistage ALIP 120 includes multiple stages having and/or at least partially defined by separate, respective sets of induction coils that are each independently electrically connected to a separate polyphase power supply 144-1 to 144-N via a separate polyphase power cable 146-1 to 146-N, the EMP control system 150 may independently control and/or adjust the polyphase electrical power supplied by the separate polyphase power supplies 144-1 to 144-N to independently control the separate stages 330-1 to 330-N of the multistage ALIP 120. Such independent control of each power supply 144-1 to 144-N may include causing the polyphase power supply 144-1 to 144-N to initiate a supply of polyphase electrical power to the electrically connected stage(s) 330-1 to 330-N via a respective polyphase power cable 146-1 to 146-N, causing the power supply 144-1 to 144-N to adjust a frequency and/or current of the electrical power supplied by the polyphase power supply 144-1 to 14-N, and/or causing the power supply 144-1 to 144-N to inhibit a supply of polyphase electrical power to the electrically connected stage(s) via a respective polyphase power cable 146-1 to 146-N. Such control may be implemented based on the EMP control system 150 generating a control signal and transmitting the control signal to the polyphase power supply 144-1 to 144-N, based on the EMP control system 150 executing code stored on a memory.

The EMP control system 150, in some example embodiments, includes one or more computer systems. A computer system may include one or more instances of circuitry. The one or more instances of circuitry may include one or more processor devices ("processors") coupled to one or more instances of memory. The one or more processors may include one or more central processor units (CPUs). The one or more processors may be configured to implement the EMP control system. For example, the one or more instances of memory (e.g., one or more memories) may include a non-transitory computer-readable medium storing a program of instructions (e.g., a solid stage drive), and the one or more processors may include processing circuitry configured to execute the program of instructions stored on the non-transitory computer-readable medium to perform one or more operations of any of the methods according to any of the example embodiments.

In some example embodiments, a multistage ALIP 120 provides improved flexibility and control over the liquid metal coolant flow rate in the primary coolant loops 119, as the EMP control system 150 can apply more flexible control over the flow rate based on independently controlling separate stages of the multistage ALIP 120 based on independently controlling the polyphase electrical power that is independently supplied by separate polyphase power supplies 144-1 to 144-N to the separate sets of induction coils corresponding to and/or at least partially defining the separate stages 330-1 to 330-N. Additionally, as described herein, separate stages may be associated with various different geometries and/or intrinsic properties of various components of the multistage ALIP 120, such that controlling different stages may have different effects upon the flow of liquid metal coolant 190, and thus different stages may be controlled to induce different effects upon the liquid metal coolant 190 flow. Various configurations (e.g., parameters) of polyphase electrical power supplied independently to the separate stages of the multistage ALIP 120 may increase the range of operational states of the multistage ALIP 120 that can be achieved by the EMP control system 150, including an increased range (e.g., increased quantity) of separate, discrete flow rates of the liquid metal coolant 190 that can be induced by the multistage ALIP 120. As a result, operational performance and/or efficiency of the primary coolant loop 119, and thus the nuclear reactor 110 and nuclear plant 100 as a whole, may be improved based on the improved control over the liquid metal coolant 190 flow that is enabled by the multistage ALIP 120.

In some example embodiments, the intermediate coolant loop 160 includes one or more multistage ALIPs 120 which are illustrated to be included in the primary coolant loop 119. A multistage ALIP 120 included in the intermediate coolant loop 160 may be configured to operate similarly to the multistage ALIP 120 included in the primary coolant loop 119. A set of one or more multistage ALIPs 120 included in the intermediate loop may be located internal or external to the nuclear reactor pressure vessel 111.

As referred to herein, the liquid metal coolant may include one or more various liquid metal substances, including one or more of sodium, mercury, lead, bismuth, or tin. The one or more liquid metal substances may be conductive metal substances, such that a multistage ALIP 120 is configured circulate the liquid metal coolant.

Figure 2:
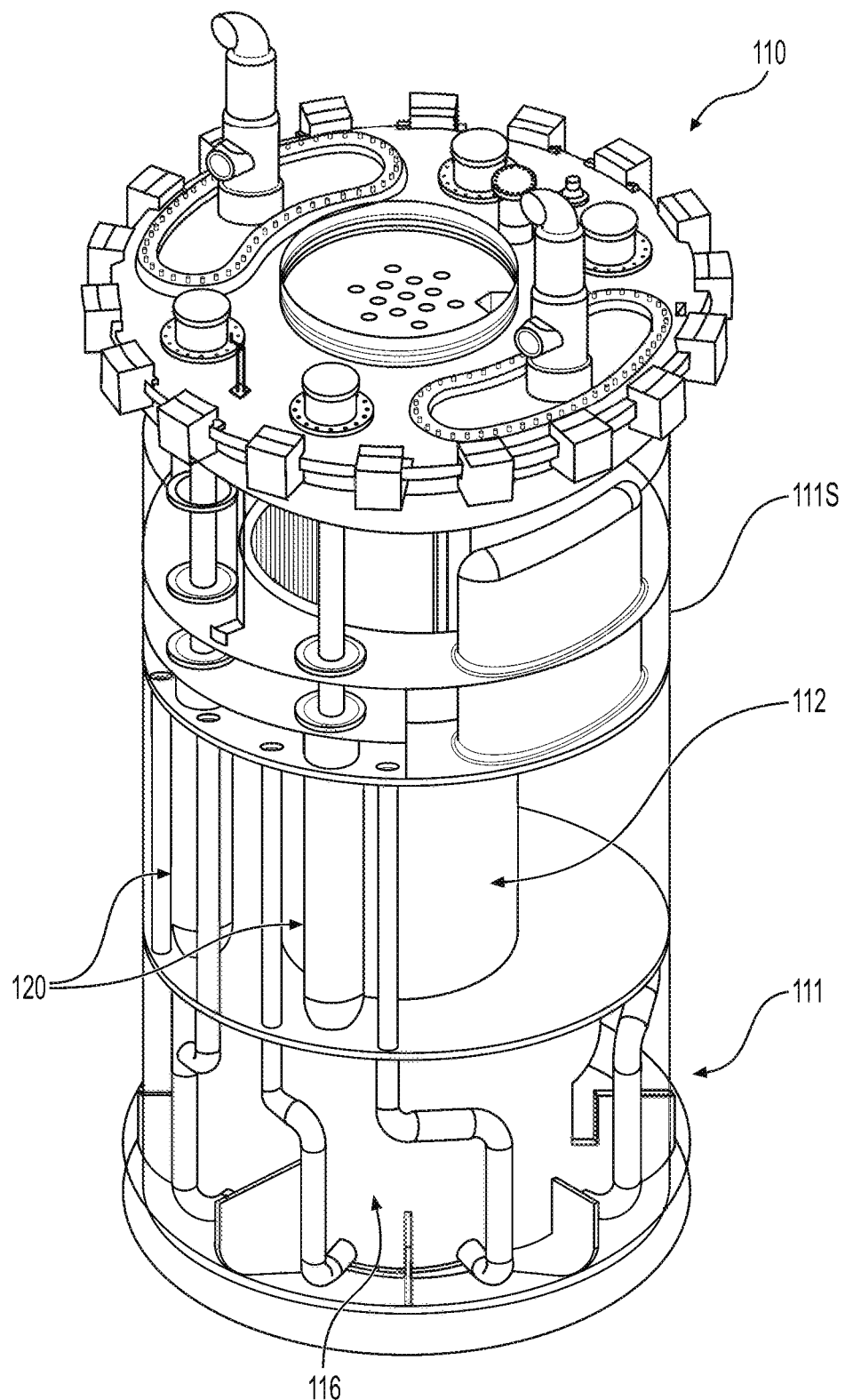
FIG. 2 is a perspective view of a liquid metal-cooled nuclear reactor, according to some example embodiments.

FIG. 2 is a perspective view of a liquid metal-cooled nuclear reactor, according to some example embodiments. The nuclear reactor 110 illustrated in FIG. 2 may be included in any of the embodiments of nuclear reactors included herein, including the nuclear reactor 110 shown in FIG. 1.

As shown in FIG. 2, a nuclear reactor 110 may include a nuclear reactor pressure vessel 111 and may further include, within the nuclear reactor pressure vessel 111, a set of multiple multistage ALIPs 120, although it will be understood that in some example embodiments only a single multistage ALIP 120 may be included within the nuclear reactor pressure vessel 111. As shown in FIG. 2, where the nuclear reactor 110 includes multiple ALIPs 120, the ALIPs 120 may be coupled in parallel to separate, parallel return lines 124 and may be configured to operate in parallel in the primary coolant loop 119 such that each multistage ALIP 120 induce parallel flows of separate portions of the liquid metal coolant 190 through the primary coolant loop 119.

Each of the multistage ALIPs 120 shown in FIG. 2 may be structurally identical or different from each other. For example, the multistage ALIPs 120 may have identical configurations of stages, component structures, and/or component intrinsic properties. In some example embodiments, the multistage ALIPs may have different configurations of stages, component structures, and/or component intrinsic properties.

Figure 3A:
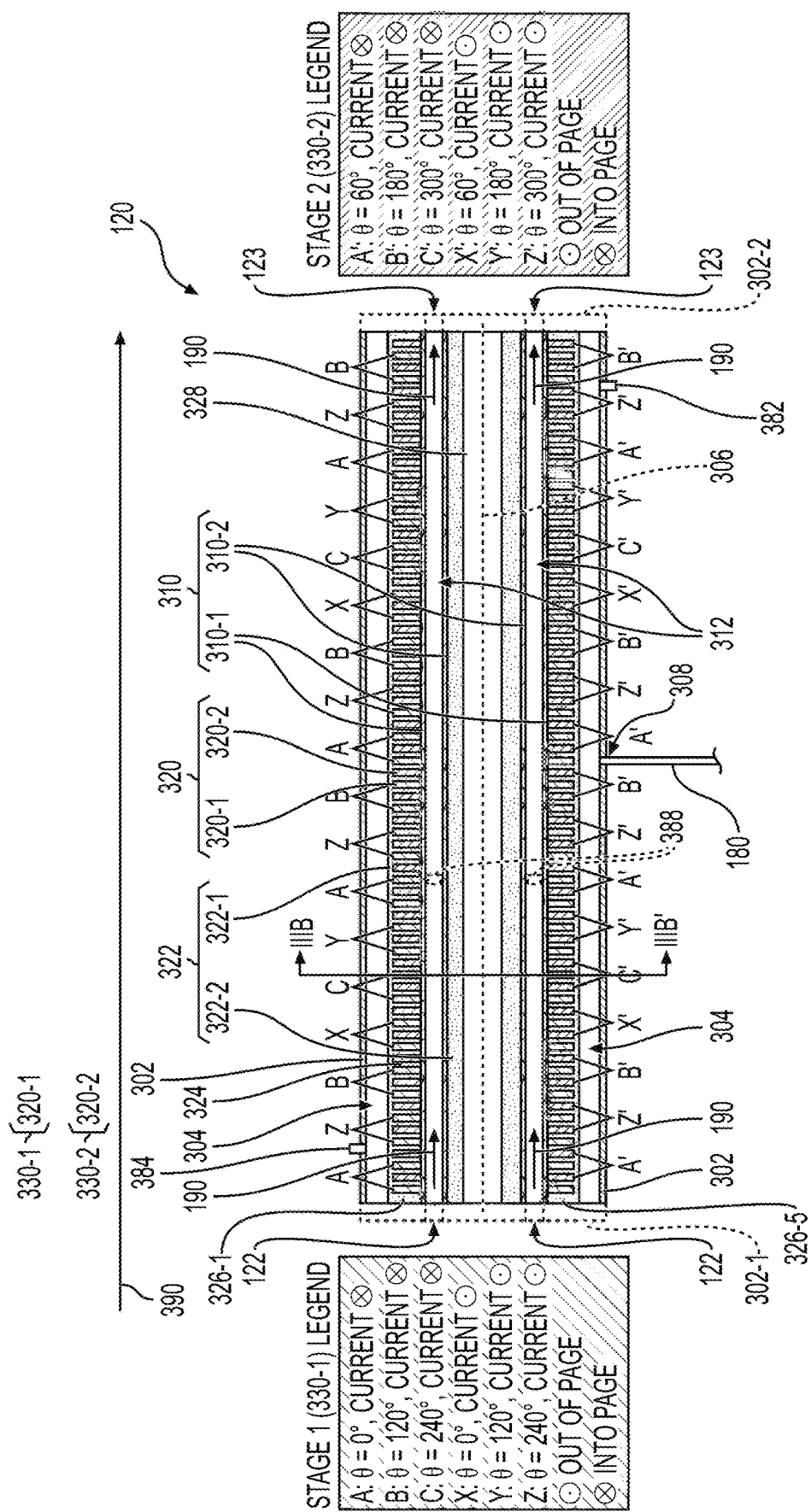
FIG. 3A is a plan side cross-sectional view of a multistage Annular Linear Induction Pump (ALIP), according to some example embodiments.
Figure 3B:
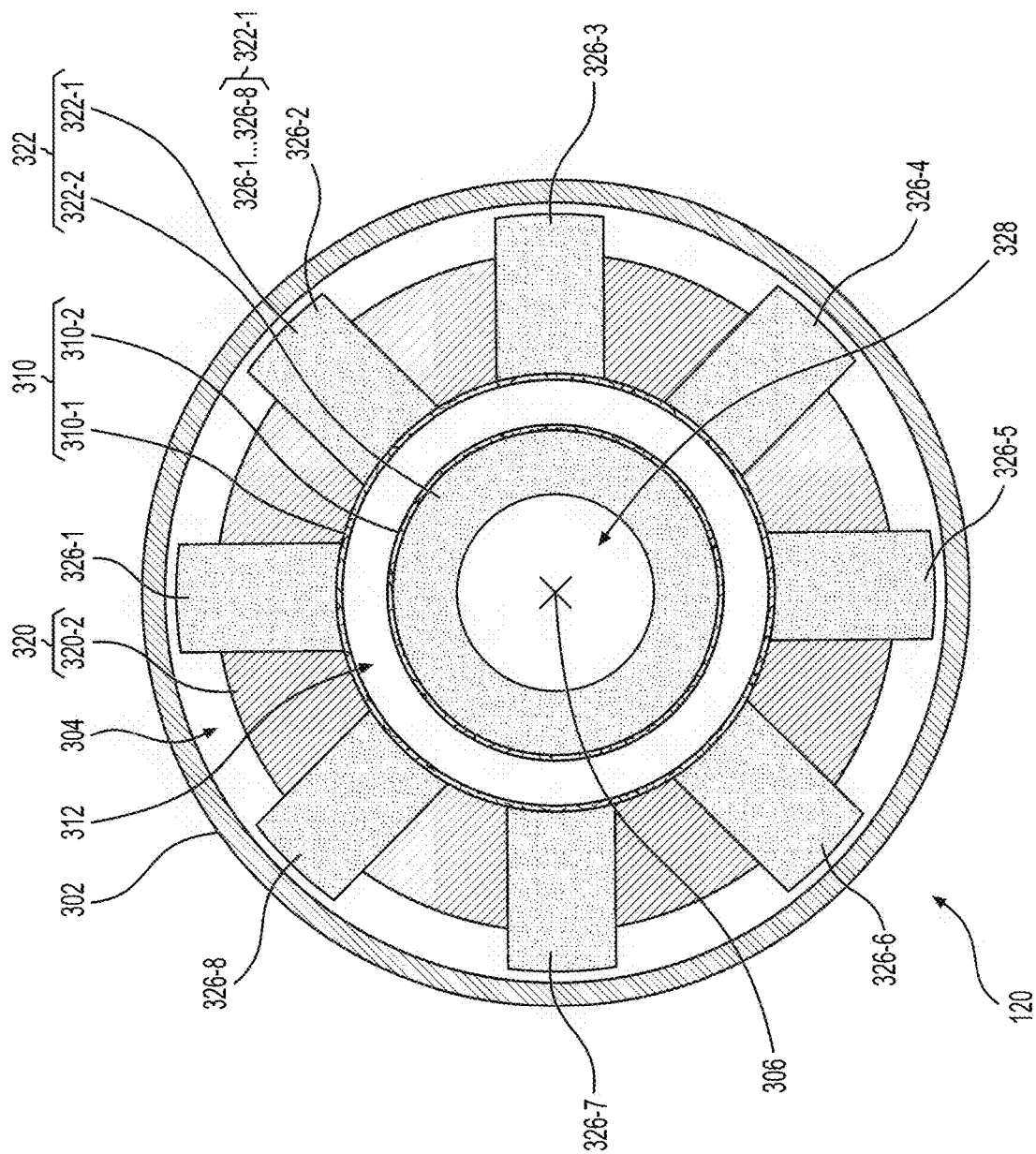
FIG. 3B is a plan frontal cross-sectional view of a multistage ALIP along cross-sectional view line IIIB-IIIB' in FIG. 3A, according to some example embodiments.

FIG. 3A is a plan side cross-sectional view of a multistage ALIP 120, according to some example embodiments. FIG. 3B is a plan frontal cross-sectional view of a multistage ALIP 120 along cross-sectional view line IIIB-IIIB' shown in FIG. 3A, according to some example embodiments. FIG.

3C is a schematic view of a wiring diagram for a multistage ALIP, according to some example embodiments.

The multistage ALIP 120 shown in FIGS. 3A-3B may be included in any of the multistage ALIPs 120 included herein, including the one or more multistage ALIPs 120 illustrated in FIG. 1 and/or FIG. 2. The wiring diagram shown in FIG. 3C may be a wiring diagram for a multistage ALIP 120 according to any of the example embodiments, including the multistage ALIP 120 shown in at least FIGS. 3A-3B.

The multistage ALIP 120 shown in FIGS. 3A-3B (and also FIGS. 5-6) is illustrated as a two-stage ALIP (e.g., a multistage ALIP 120 having N stages 330-1 to 330-N where N=2), but example embodiments are not limited thereto and the description herein with regard to any two-stage multistage ALIP 120 and any stage thereof may be applied to any multistage ALIP 120 having more than two stages (e.g., 330-1 to 330-N where N>2) and any stage thereof.

Referring to FIGS. 3A-3B, a multistage ALIP 120 may include a pump casing 302 (also referred to as an outer casing, casing structure, etc.) having a central longitudinal axis and extending in a longitudinal direction. As shown in FIGS. 3A-3B, the pump casing 302 may partially or fully define (e.g., at least partially define) an interior space of the multistage ALIP 120. As further shown, the central longitudinal axis of the pump casing 302 may be paraxial to and/or may be coaxial with (e.g., may be the same as and/or may at least partially define) the longitudinal axis 306 of the multistage ALIP 120.

While the pump casing 302 may be open at the opposite longitudinal ends of the multistage ALIP 120, it will be understood that in some example embodiments the pump casing 302 may, alone or combination with to one or more structures to which the pump casing 302 is coupled, partially or fully seal the opposite longitudinal ends of the interior space, except for openings in the pump casing 302 that define the inlet 122 and outlet 123 of the multistage ALIP 120. For example, as shown in FIG. 3A, the multistage ALIP 120 may include an inlet-side structure 302-1 that structurally encloses the inlet-side longitudinal end of the multistage ALIP 120 except for one or more openings to an inlet-side longitudinal end of the flow annulus 312, where the one or more openings (e.g., one or more arcuate and/or annular openings) at least partially define the inlet 122 into the flow annulus 312 and thus into the multistage ALIP 120. In another example, as shown in FIG. 3A, the multistage ALIP 120 may further include an outlet-side structure 302-2 that structurally encloses the outlet-side longitudinal end of the multistage ALIP 120 except for one or more openings to an outlet-side longitudinal end of the flow annulus 312, where the one or more openings (e.g., one or more arcuate and/or annular openings) at least partially define the outlet 123 into the flow annulus 312 and thus into the multistage ALIP 120. The pump casing 302, the inlet-side structure 302-1, and/or the outlet-side structure 302-2, may comprise one or more metal materials, for example stainless steel (e.g., 304 stainless steel), carbon steel, or the like. In some example embodiments, the pump casing 302, inlet-side structure 302-1, and/or outlet-side structure 302-2 may be separate pieces of material that are coupled together or may be separate parts of a single, unitary piece of material.

As shown in FIGS. 3A-3B, a multistage ALIP 120 may include concentric annular walls 310 extending coaxially with the longitudinal axis 306 and collectively defining a flow annulus 312 extending coaxially with the longitudinal axis 306 along the length (e.g., the entire length as shown in FIG. 3A) of the multistage ALIP 120. As shown, the concentric annular walls 310 may include an outer annular wall 310-1 and an inner annular wall 310-2. As shown, an outer surface of the inner annular wall 310-2 and an inner surface of the outer annular wall 310-1 collectively define the flow annulus 312 as an annular space, or "annulus," between these surfaces. As shown in FIGS. 3A-3B, the concentric annular walls 310 may each be a cylindrical tube, but example embodiments are not limited thereto. The outer annular wall 310-1 and the inner annular wall 310-2 may each comprise a metal material, for example stainless steel (e.g., 304 stainless steel), carbon steel, or the like.

Still referring to FIGS. 3A-3B, the multistage ALIP 120 may include a plurality of induction coils 320 within the interior space of the multistage ALIP 120. As shown, each induction coil 320 surrounds the longitudinal axis 306 and has a central axis that is coaxial with the longitudinal axis 306. As shown in FIG. 3A, the induction coils 320 are spaced apart from each other (e.g., isolated from direct contact with each other) in the longitudinal direction 390. In some example embodiments, the induction coils 320 may be referred to as "solenoids" of a stator of the multistage ALIP 120. The induction coils 320 may each comprise one or more conductive materials (e.g., windings of one or more conductive materials), including copper, silver, or the like.

As further shown in FIGS. 3A-3B, the multistage ALIP 120 may include a stator core 322, including an outer core 322-1 that is located radially distal to the longitudinal axis 306 in relation to the outer annular wall 310-1 and a central core 322-2 that is located radially proximate to the longitudinal axis 306 in relation to the inner annular wall 310-2. The stator core 322 comprises one or more magnetic materials, for example magnetic iron. The outer core 322-1 and the central core 322-2 may comprise a same material composition or different material compositions. For example, the outer core 322-1 and the central core 322-2 may each comprise iron (e.g., magnetic iron), but example embodiments are not limited thereto. For example, at least one of the outer core 322-1 or the central core 322-2 may at least partially comprise stainless steel in some example embodiments.

Figure 3C:
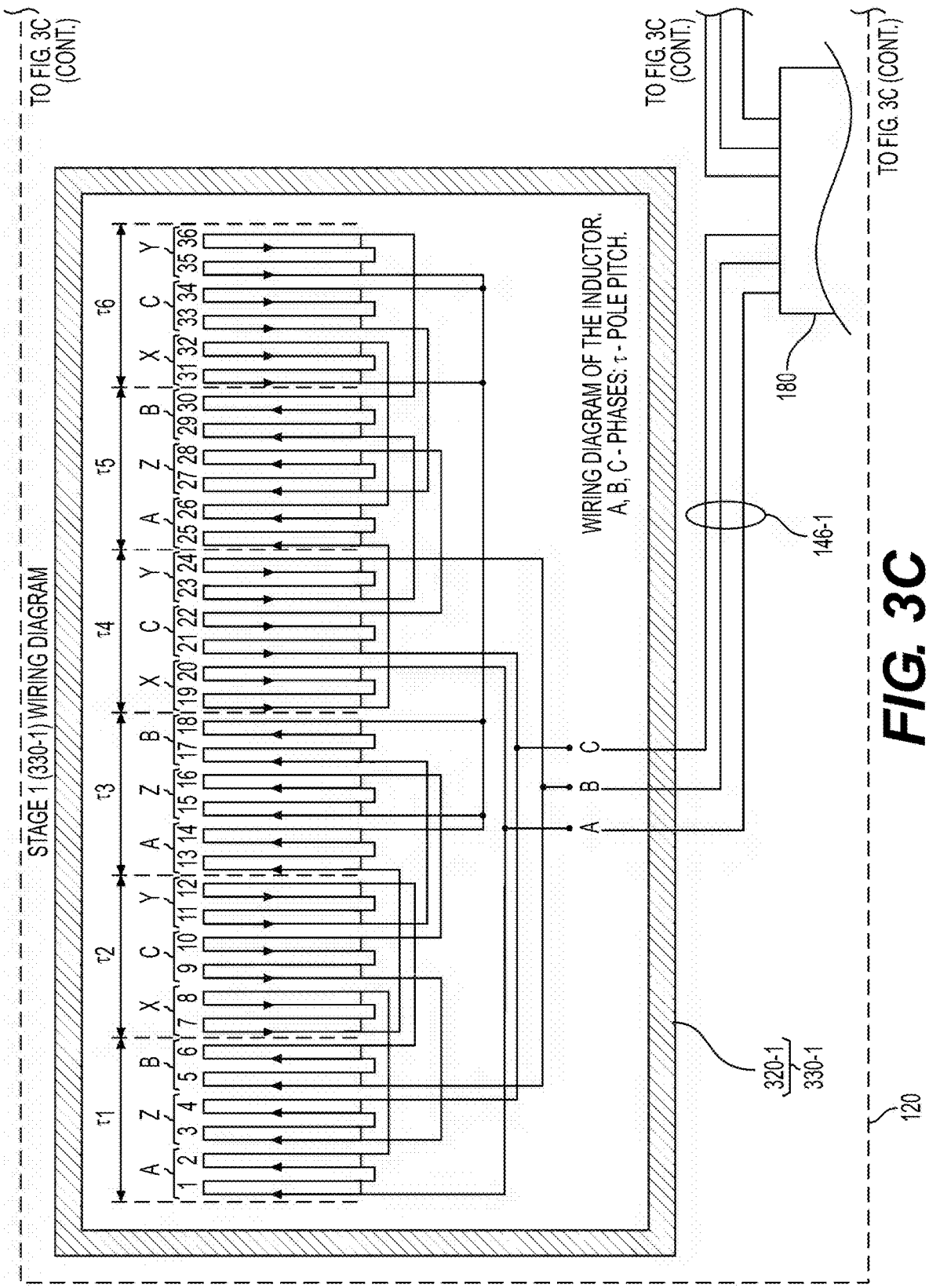
FIG. 3C is a schematic view of a wiring diagram for a multistage ALIP, according to some example embodiments.
Figure 3C:
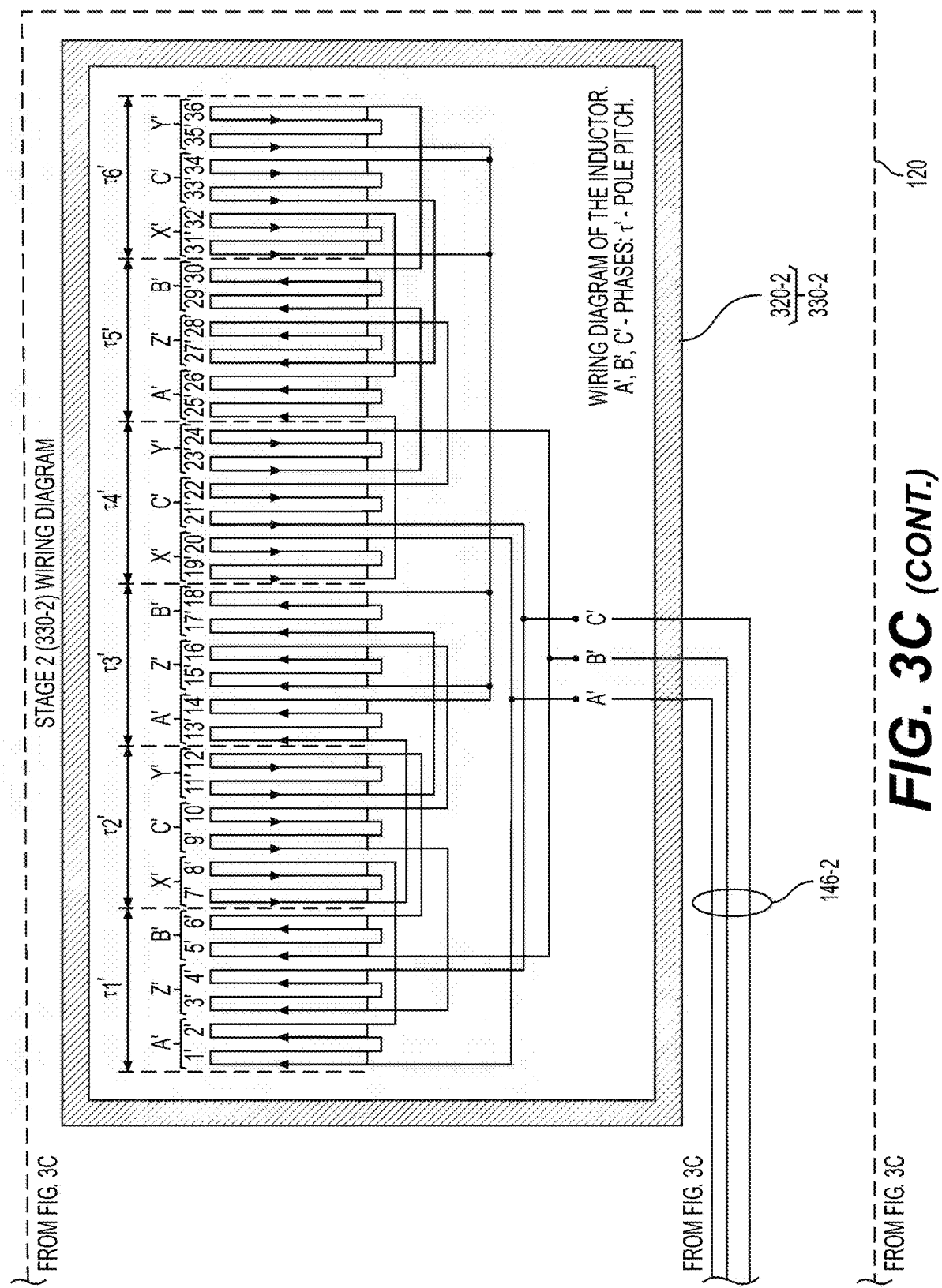

As shown in FIGS. 3A-3B, the outer core 322-1 may comprise a plurality of block structures, for example eight block structures 326-1 to 326-8 as shown in FIG. 3B (the quantity of block structures in the outer core 322-1 is not limited to eight and could be any quantity). The block structures of the outer core 322-1 may be linear beam or rod-shaped structures (e.g., linear beam or rod-shaped block structures 326-1 to 326-8 as shown in FIGS. 3A and 3C) that each extend paraxial to the longitudinal axis 306 along the length of the multistage ALIP 120 and are at least partially spaced apart azimuthally around the longitudinal axis 306. In some example embodiments, the outer core 322-1 may comprise one or more arcuate structures, or a single cylindrical structure that extends around some or all of the circumference of the outer surface of the outer annular wall 310-1. However, an outer core 322-1 that includes multiple, spaced-apart block structures (e.g., 326-1 to 326-8) may provide weight savings in the multistage ALIP 120 in relation to an outer core 322-1 that is a single-piece cylindrical structure.

As shown in FIGS. 3A and 3C, in some example embodiments, the central core 322-2 may comprise a singular cylindrical structure that extends around the longitudinal axis 306 and further extends in the longitudinal direction coaxially with the longitudinal axis 306.

As shown, each block structure (e.g., 326-1 to 326-8) of the outer core 322-1 may include longitudinally-spaced tooth structures 324 configured to receive and enclose separate induction coils 320 therebetween in at least the longitudinal direction 390 and a radial direction distally from the longitudinal axis 306.

As shown in at least FIGS. 3A and 3C, in some example embodiments the central core 322-2 may be a hollow cylindrical structure having one or more inner cylindrical sidewall surfaces that define a central space 328 (e.g., central void) that extends coaxially with the longitudinal axis 306 (e.g., located at a radial center of the multistage ALIP 120). The central space 328 may be configured to accommodate (e.g., house) cabling for the multistage ALIP 120, may be configured to direct a heat exchange fluid (e.g., coolant gas, such as helium) therethrough to provide cooling to the multistage ALIP 120, or the like. In some example embodiments, the central core 322-2 may be a solid cylindrical structure that occupies some or all of the space defined by the inner diameter of the inner annular wall 310-2, such that the central space 328 may be absent from the multistage ALIP 120.

As shown in FIGS. 3A and 3C, an inner surface of the pump casing 302 and outer surfaces of the induction coils 320 and/or outer core 322-1 (e.g., opposing surfaces of the pump casing 302 and the induction coils 320 and outer core 322-1) may collectively at least partially define an outer annular space 304 (e.g., an outer void) that extends around the outer core 322-1 and induction coils 320 (e.g., radially distally therefrom) and between the inner surface of the pump casing 302 and outer surfaces of the induction coils 320 and/or outer core 322-1. The outer annular space 304 may be configured to direct a heat exchange fluid (e.g., a coolant fluid, such as helium gas, air, or the like) through the multistage ALIP 120 to provide cooling of the multistage ALIP 120. For example, as shown in FIG. 3A, the multiage ALIP 120 may include a coolant fluid inlet 382 through the pump casing 302 and into the outer annular space 304 proximate to one longitudinal end of the multistage ALIP 120, and the multiage ALIP 120 may further include a coolant fluid outlet 384 through the pump casing 302 and into the outer annular space 304 proximate to an opposite longitudinal end of the multistage ALIP 120. The coolant fluid inlet 382 and coolant fluid outlet 384 may be coupled to a coolant loop of the nuclear plant 100 (not shown). The coolant loop may be configured to circulate a coolant fluid (e.g., helium gas) into the outer annular space 304 through the coolant fluid inlet 382, through the outer annular space 304 from coolant fluid inlet 382 to coolant fluid outlet 384, and out of the multistage ALIP 120 via coolant fluid outlet 384. The coolant fluid, upon exiting the multistage ALIP 120 via the coolant fluid outlet 384, may be circulated through a heat exchange to remove heat that is absorbed into the coolant fluid from the multistage ALIP 120 while the coolant fluid is flowing through the outer annular space 304 between the coolant fluid inlet 382 and the coolant fluid outlet 384, and the coolant fluid may be circulated from the heat exchanged back to the coolant fluid inlet 382 (e.g., through a pump). The coolant loop may be extend at least partially out of the nuclear reactor pressure vessel 111 (e.g., the aforementioned heat exchanger may be located external to the nuclear reactor pressure vessel 111 and the coolant loop may circulate coolant fluid between the multistage ALIP 120 in the nuclear reactor pressure vessel 111 and the heat exchanger that is outside the pressure vessel via one or more penetrations through the outer wall 111S.

Still referring to FIGS. 3A-3B, the inner annular wall 310-2, central core 322-2, and any structures located radially inward from the inner annular wall 310-2 in the multistage ALIP 120 may be structurally connected to the outer annular wall 310-1, outer core 322-1, induction coils 320, pump casing 302, and any structures located radially outward from the inner annular wall 310-2 in the multistage ALIP 120 via one or more support ribs 388 (also referred to as "stilts") extending radially outward between the concentric annular walls 310 in the flow annulus 312 to structurally connect the outer and inner annular walls 310-1 and 310-2 to each other, thereby structurally coupling the central/core portion of the multistage ALIP 120 to the outer portion of the multistage ALIP 120 and thus structurally stabilizing and supporting the central/core portion (e.g., inner annular wall 310-2, central core 322-2, etc.) in relation to the outer portion (e.g., outer annular wall 310-1, outer core 322-1, induction coils 320, pump casing 302, etc.).

In some example embodiments, support ribs 388 may further extend through the outer annular space 304 between the outer core 322-1 and the pump casing 302 to structurally stabilize and support at least the outer core 322-1 in relation to the pump casing 302.

In some example embodiments, support ribs 388 may be omitted from the multistage ALIP 120. The pump casing 302 may include inlet-side structure 302-1 and outlet-side structure 302-2 which are coupled to the cylindrical portion of the pump casing 302 that has the longitudinal axis 306, where the inlet-side structure 302-1 and outlet-side structure 302-2 may be structurally connected to one or both of the outer portion of the multistage ALIP 120 (e.g., the outer annular wall 310-1, outer core 322-1, and/or induction coils 320) and the central/core portion of the multistage ALIP 120 (e.g., the inner annular wall 310-2 and/or central core 322-2) and thus the inlet-side structure 302-1 and outlet-side structure 302-2 may structurally couple, stabilize, and support the outer and central/core portions of the multistage ALIP 120 in relation to each other.

Still referring to FIGS. 3A-3B, the multistage ALIP 120 may be configured to pump (e.g., induce flow) of liquid metal coolant 190 through the flow annulus 312 based on applying electromagnetic forces on the flowing liquid metal coolant 109 through the length (e.g., longitudinal direction 390) of the multistage ALIP 120. This may be performed based on applying (e.g., supplying) polyphase electrical power to the induction coils 320 at particular frequencies and phase angles. For example, the polyphase electrical power as described herein may include AC power, for example three phase AC power, which may be applied at specified AC frequencies and phase angles to induction coils 320 that surround the flow annulus 312.

As shown by the wiring diagrams presented in FIG. 3A, a fixed phase of polyphase electrical power from a particular, electrically connected polyphase power source may be applied to each induction coil 320. As shown in FIG. 3A, where a set 320-1 of induction coils 320 are electrically connected to a polyphase power supply 144-1 via a polyphase power cable 146-1, and where the polyphase power supply 144-1 supplies polyphase electrical power that is three-phase AC power, the phase of a given induction coil in set 320-1 may be the phase of the previous longitudinally adjacent induction coil (in a direction opposite the longitudinal direction 390) that is included in the same set 320-1 (e.g., is electrically connected to the same polyphase power supply 144-1), plus 60 or 120 degrees, to allow for a sequence, in the longitudinal direction 390, of induction coils 320 in the given set 320-1, to complete an AC cycle of 360 degrees. The collection of coils that complete this 360 degree AC cycle is called a pole (I) or a "slot". The length of a pole is called the pole pitch (g).

The supply of polyphase electrical power to the induction coils 320 may be controlled, for example based on controlling a frequency, power amplitude (e.g., current and/or voltage), and/or phase angles of the supplied polyphase electrical power, in order to cause a specific pressure rise in the liquid metal coolant 190 in the flow annulus 312 along the length of the pump (e.g., in the longitudinal direction 390). With the electrical phase of each induction coil 320 being fixed based on connection to a separate wire of a particular conductor 146, and the internal components being stationary within the pump casing 302, the pressure rise may be controlled based on controlling and/or adjusting the frequency, power amplitude (e.g., current and/or voltage), and/or phase angles of the polyphase electrical power supplied from an electrically connected polyphase power supply to the induction coils 320.

Pump performance curves specify these values (and sometimes the ratio of these values) to illustrate what settings (e.g., polyphase electrical power frequency, power amplitude (e.g., current and/or voltage), phase angles, etc.) should be used at a given inlet mass flow rate of liquid metal coolant into the pump via inlet 122 to provide a desired pressure rise. These pump performance curves may be determined analytically with engineering analysis software or experimentally through taking measurements of test pumps.

For example, FIG. 4, which is a graph showing performance of an ALIP based on electrical power supplied to induction coils of the ALIP, according to some example embodiments, illustrates that, given a volumetric flow rate, the applied current, voltage, and/or frequency of polyphase electrical power (e.g., three-phase AC power) supplied to a given set of induction coils 320 may be adjusted to provide a desired pressure rise in the liquid metal coolant 190 in a multistage ALIP 120. This is because the current and frequency changes of the power supplied by a polyphase power supply 144-1 to 144-N are applied to every induction coil 320 that is electrically connected to that same polyphase power supply 144-1 to 144-N. Accordingly, the flow operating range and sensitivity of an ALIP is therefore based on the polyphase power supply(ies) to which the induction coils 320 are electrically connected via polyphase power cables 146-1 to 146-N.

Still referring to FIGS. 3A-3B, the induction coils 320 may include a plurality of "N" sets 320-1 to 320-N of induction coils 320, "N" being any positive integer. As shown in FIGS. 3A-3C, N may equal 2, but example embodiments are not limited thereto. As further shown, each separate set 320-1, 320-2 of induction coils 320 is included in, and may at least partially define separate, respective stages (e.g., a first stage 330-1 and a second stage 330-2) of the multistage ALIP 120.

For example, as shown in FIG. 3A, the sets 320-1, 320-2 of induction coils 320 may be configured to be electrically connected to separate, respective (e.g., different) polyphase power supplies 144-1, 144-2 of a plurality of polyphase power supplies 144-1 to 144-N and thus may at least partially define separate, first and second stages 330-1, 330-2 of the multistage ALIP 120. The separate stages 330-1, 330-2 at least partially defined by the separate sets 320-1, 320-2 of induction coils 320 may be configured to be controlled independently of each other, based on independent control and/or adjustment of the separate, independent polyphase power supplies 144-1, 144-2 electrically connected thereto via respective polyphase power cables 146-1, 146-2, to adjustably control a flow of liquid metal coolant 190 through the flow annulus 312 and thus through a primary coolant loop 119 to which the multistage ALIP 120 is coupled.

For example, as shown in FIG. 3A, set 320-1, which at least partially defines a first stage 330-1 of the multistage ALIP 120, is electrically connected to a first polyphase power supply 144-1 via a first polyphase power cable 146-1 (e.g., a three-phase conductor delivering phases A, B, C of three-phase AC power from the first polyphase power supply 144-1) and thus may be independently controlled (e.g., controlled independently of other coils 320 that are not included in stage 330-1) based on independently controlling the power supplied by the first polyphase power supply 144-1.

In addition, set 320-2 at least partially defines a second stage 330-2 of the multistage ALIP 120 and includes induction coils 320 that are electrically connected to a separate (e.g., different) second polyphase power supply 144-2 via a second polyphase power cable 146-2 (e.g., a separate three-phase conductor delivering phases A', B', C' of three-phase AC power from the second polyphase power supply 144-2). As shown, the phase of a given induction coil in set 320-2 may be the phase of the previous longitudinally adjacent induction coil (in a direction opposite the longitudinal direction 390) that is included in the same set 320-2 (e.g., is electrically connected to the same polyphase power supply 144-2), plus 60 or 120 degrees, to allow for a sequence, in the longitudinal direction 390, of induction coils 320 in the given set 320-1, to complete an AC cycle of 360 degrees. The collection of coils that complete this 360 degree AC cycle is called a pole ($\tau'$) or a "slot". The length of a pole is called the pole pitch ($\tau_p'$).

Because the sets 320-1 and 320-2 of induction coils 320 included in separate stages 330-1 and 330-2 are electrically connected to different polyphase power supplies 144-1 and 144-2, the power supplied to each set, or stage at least partially defined thereby, may be controlled and/or adjusted independently of the power supplied to the other set, or stage. Accordingly, the separate stages 330-1, 330-2 may be independently controlled, via independent control and/or adjustment of the power supplied to each stage, to enable improved flexibility and/or granularity of control over the pressure rise along the length of the multistage ALIP 120 in the longitudinal direction 390, thereby enabling improved control over the flow rate of the liquid metal coolant 190 induced by the multistage ALIP 120. Such improved control may enable improved operational efficiency and/or overall performance of the multistage ALIP 120.

Still referring to FIGS. 3A-3B, in some example embodiments, the multistage ALIP 120 includes at least two stages 330-1, 330-2 that are at last partially defined by separate sets of induction coils 320-1, 320-2, where the separate sets 320-1, 320-2 of induction coils, and thus the stages 330-1, 330-2, are at least partially interlaced with each other in the longitudinal direction 390. As shown, for example, the induction coils 320 of separate stages 330-1, 330-2 may alternate in the longitudinal direction 390 between a coil 320 of the set 320-1 of the first stage 330-1 (electrically connected to the first polyphase power supply 144-1) and a coil 320 of the second set 320-2 of the second stage 330-2 (electrically connected to the second polyphase power supply 144-2). As a result, and as shown in FIG. 3A, at least one induction coil 320 of one set of induction coils (e.g., a first set 320-1) may be located between at least two induction coils 320 of a different set of induction coils (e.g., a second set 320-2) in the longitudinal direction 390.

The interlaced arrangement of the stages 330-1, 330-2 at least partially defined by the sets 320-1, 320-2 of induction coils may enable improved control over the pressure rise in the longitudinal direction 390 along the entire length of the multistage ALIP 120.

Referring now to FIG. 3C and FIG. 4, polyphase electrical power (e.g., three phase AC power) may be applied to one or more stages 330-1, 330-2 of the multistage ALIP 120 where the phase and current directions for each induction coil 320 are fixed, or predetermined, so that the application of polyphase electrical power to one or more sets of induction coils 320 causes the induction coils 320 to generate a travelling electromagnetic (EM) wave that induces a continuous flow of liquid metal coolant 190 located in the flow annulus 312 in the longitudinal direction 390 from the inlet 122 to the outlet 123. The polyphase electrical power applied to one or more sets 320-1, 320-2 of induction coils 320, and thus to the separate one or more stages 330-1, 330-2, may have a particular frequency and power amplitude (e.g., current and/or voltage) which may be set (e.g., controlled and/or adjusted) by EMP control system 150 via controlling the respective one or more polyphase power supplies 144-1, 144-2 that are electrically connected to the one or more sets 320-1, 320-2 of induction coils. Accordingly, the frequency and/or power amplitude (e.g., voltage and/or current) of the polyphaser electrical power supplied by the one or more polyphase power supplies 144-1, 144-2 may be controlled and/or adjusted (e.g., initiated, adjusted, and/or inhibited). Such control and/or adjustment of the frequency and/or power amplitude of polyphase electrical power applied to one or more sets of induction coils 320 (and thus one or more stages) of the multistage ALIP 120 changes the performance of the multistage ALIP in pumping (e.g., inducing flow of) liquid metal coolant 190 therethrough, for example as shown in the chart of FIG. 4.

Still referring to FIGS. 3A-3C, a multistage ALIP 120 may enable additional flexibility for controllably adjusting the pressure rise in the liquid metal coolant 190 in the flow annulus 312 along the longitudinal direction 390 within the multistage ALIP 120, based on the different induction coils 320 being separated into different stages 330-1, 330-2, having and/or at least partially defined by different sets 320-1, 320-2 of induction coils 320 that are independently electrically connected to separate, respective polyphase power supplies 144-1, 144-2 that are independently controllable (e.g., by EMP control system 150) so that the respective supplies of polyphase electrical power to the separate stages of induction coils 320 in the multistage ALIP may be controlled and/or adjusted independently of each other, thereby providing improved capability for adjustably controlling the performance of the multistage ALIP 120. For example, one stage 330-1 may be initiated (e.g., turned on) while another stage 330-2 may be adjusted or inhibited (e.g., turned off) independently of the one stage 330-1.

As shown in FIGS. 3A-3C, the induction coils 320 of the separate stages 330-1, 330-2 may be at least partially interlaced in the longitudinal direction 390 and the phases of the induction coils 320 may be varied.

As shown in FIGS. 3A and 3C, the multistage ALIP 120 may be a two-stage ALIP having interlaced stages 330-1, 330-2 having and/or at least partially defined by separate, respective sets 320-1, 320-2 of induction coils, and where the induction coils 320 of set 320-1 configured to receive the A phase of electrical power from polyphase power supply 144-1 via polyphase power cable 146-1 are interlaced with the induction coils 320 of set 320-2 that are configured to receive the A' phase of electrical power from polyphase power supply 144-2 via polyphase power cable 146-2, and where the induction coils 320 of sets 320-1 and 320-2 configured to receive the respective B, B' phases and C, C' phases of electrical power from the respective polyphase power supplies 144-1, 144-2 are similarly configured.

In such a configuration, in some example embodiments the multistage ALIP 120 may be operated in an operational mode where the polyphase electrical power supplied from polyphase power supplies 144-1, 144-2 has the same frequency and power amplitude, such that the sets 320-1, 320-2 of induction coils 320, and thus stages 330-1, 330-2 operate similarly to a single-stage ALIP receiving a single three phase power supply. The multistage ALIP 120 may be operated in another operational mode where the polyphase electrical power supplied to set 320-2 of induction coils may be adjusted or inhibited (e.g., based on EMP control system 150 causing polyphase power supply 144-2 to adjust or inhibit the supply of electrical power to the set 320-2 of induction coils 320 via polyphase power cable 146-2). In such an operational mode, the phases of electrical power supplied to set 320-1 of induction coils may be adjusted to stretch the length of the pole 1 of the set 320-1, which may be performed without changing the frequency or power amplitude (e.g., voltage and/or current) of electrical power applied to set 320-1. As a result, the flow rate of liquid metal coolant 190 through the flow annulus 312 may be caused to be reduced based on stretching the phases to lengthen the pole, without changing the frequency or power amplitude supplied to the active coils of set 320-1. Therefore, such an operational mode may be a low-flow rate operational mode of the multistage ALIP 120.

FIGS. 3A-3B illustrate a multistage ALIP 120 having a single stator, but it will be understood that in some example embodiments the multistage ALIP may include multiple stators (e.g., a double stator ALIP). Descriptions herein regarding various stages of the multistage ALIP 120 (e.g., multiple sets of induction coils configured to be electrically connected to separate, respective polyphase power supplies) may apply independently to each stator in a multi-stator multistage ALIP 120. For example, a multistage ALIP 120 having an inner stator and an outer stator may have multiple coil stages in the outer stator and may have a same or different quantity of coil stages (including a single coil stage or multiple coil stages) in the inner stator, but example embodiments are not limited thereto.

Figure 5:
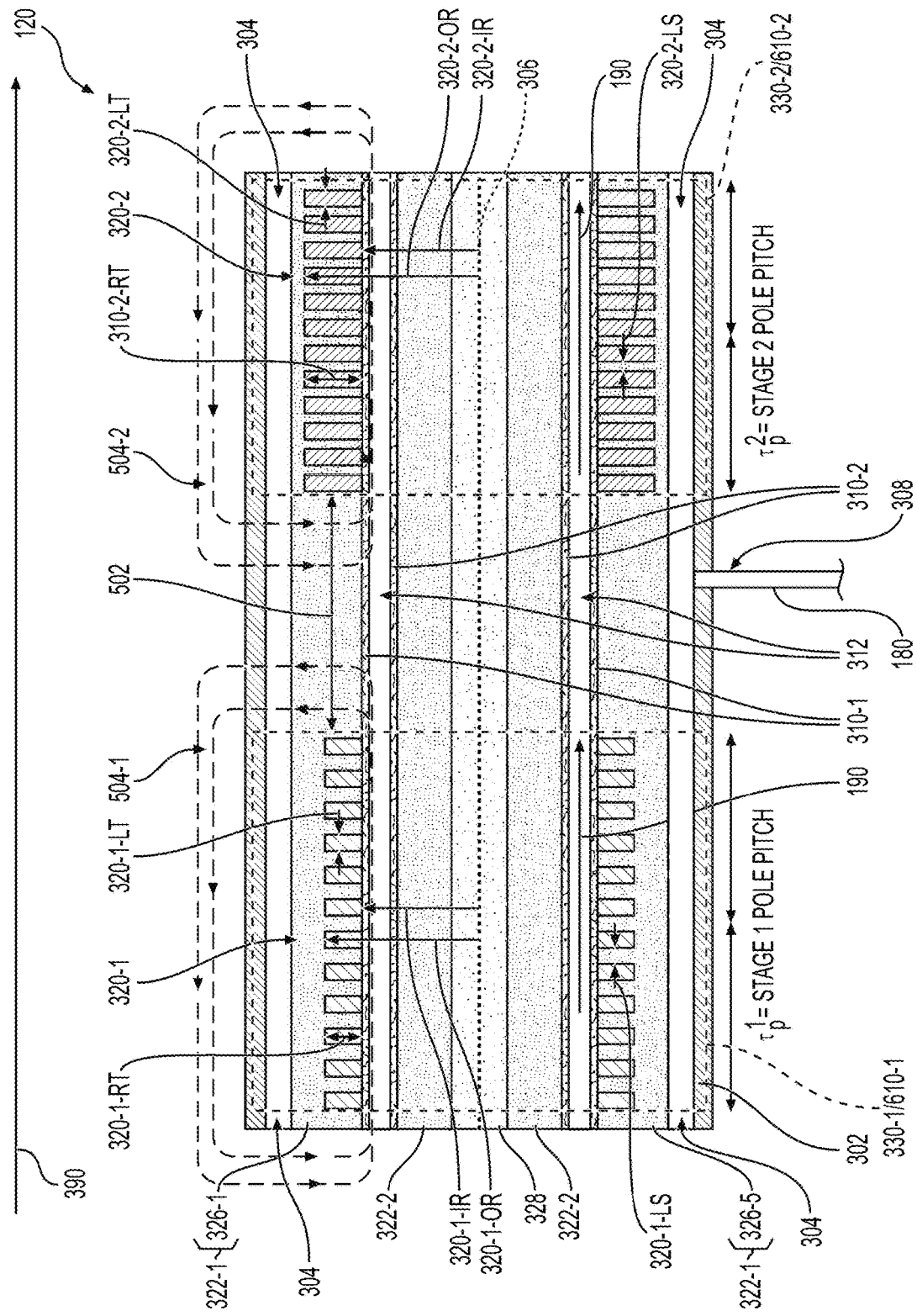
FIG. 5 is a plan side cross-sectional view of a multistage ALIP, according to some example embodiments.

FIG. 5 is a plan side cross-sectional view of a multistage ALIP, according to some example embodiments. It will be understood that a wiring diagram for the multistage ALIP of FIG. 5 may be the same as the wiring diagram shown in FIG. 3C. While some elements of the multistage ALIP 120 shown in FIGS. 3A-3C are not shown in FIG. 5 (e.g., coolant fluid inlet 382, coolant fluid outlet 384, inlet-side structure 302-1, outlet-side structure 302-2, support ribs 388, etc.), it will be understood that the multistage ALIP 120 shown in FIG. 5 may include some, all, or none of the same structures shown in FIGS. 3A-3C (e.g., coolant fluid inlet 382, coolant fluid outlet 384, inlet-side structure 302-1, outlet-side structure 302-2, support ribs 388, inlet 122, outlet 123, etc.).

Referring generally to FIG. 5, in some example embodiments, the multistage ALIP 120 may be configured to provide improved adjustable control of the flow of liquid metal coolant 190 therethrough based on a configuration and/or variation of the positioning, spacing, geometry, and/or intrinsic properties of the induction coils 320 in the separate stages of the multistage ALIP 120. Such configuration and/or variation in induction coil positioning, spacing, geometry, and/or intrinsic properties may enable improved flexibility in the control of the liquid metal coolant 190 flow rate based on adjustably and independently controlling the separate sets 320-1, 320-2 of induction coils in the separate stages 330-1, 330-2.

Referring to FIG. 5, in some example embodiments, different stages 330-1, 330-2, of the multistage ALIP 120, having separate, respective sets 320-1, 320-2 of induction coils 320, may have boundaries in the longitudinal direction 390 (e.g., longitudinal boundaries) that are defined by the longitudinal boundaries of the respective sets 320-1, 320-2 of induction coils 320 thereof. Accordingly, as shown in FIG. 5, each separate stage (e.g., 330-1, 330-2), in addition to being at least partially defined by a separate set (e.g., 320-1, 320-2) of induction coils, may be understood to include a separate, respective section 610-1, 610-2 of the multistage ALIP 120 that is at least partially defined, at least in the longitudinal direction 390, by the induction coils 320 of the respective set of the separate stage and may include some or all components or portions of components (e.g., pump casing 302, stator core 322, concentric annular walls 310, etc.) located between said longitudinal boundaries within the multistage ALIP 120. The separate stage may be further understood to include any portion of any component of the multistage ALIP (e.g., central core 332-2, concentric annular walls 310, etc.) included in such a separate section of the multistage ALIP 120 as defined by the longitudinal boundaries of the respective set of induction coils of the stage.

Referring to FIG. 5, in some example embodiments, different stages 330-1, 330-2, of the multistage ALIP 120, being at least partially defined by separate, respective sets 320-1, 320-2 of induction coils 320, may be spaced apart from each other in the longitudinal direction 390, such that no induction coil 320 of a first stage 330-1 (e.g., of set 320-1 of induction coils) is located between at least two induction coils of a second stage 330-2 (e.g., of set 320-2 of induction coils) in the longitudinal direction 390, and no induction coil 320 of the second stage 330-2 (e.g., of set 320-2 of induction coils) is located between at least two induction coils of the first stage 330-1 (e.g., of set 320-1 of induction coils) in the longitudinal direction 390. As shown, the stages 330-1, 330-2 having sets 320-1, 320-2 of induction coils may be spaced apart from each other in the longitudinal direction 390 within the multistage ALIP 120 by a longitudinal spacing distance 502. The longitudinal spacing distance 502 may be set (e.g., predetermined) so as to configure the separate stages 330-1, 330-2 of the multistage ALIP 120 to provide adjustable control of the flow rate of liquid metal coolant 190 through the flow annulus 312 at different locations along the longitudinal direction 390.

As shown in FIG. 5, the longitudinal spacing distance 502 (e.g., gap) in the longitudinal direction 390 between separate stages 330-1, 330-2 in the multistage ALIP 120 may reduce, limit, or prevent magnetic reconnection (interference) of the magnetic fields 504-1, 504-2 generated by the separate stages 330-1, 330-2, such that a spacing is present between the magnetic fields 504-1 and 504-2 in the longitudinal direction 390. As a result, a multistage ALIP 120 having the longitudinal spacing distance 502 in the longitudinal direction 390 between adjacent stages may be configured to operate as multiple, independent ALIPs in series, in the same device, where each separate stage may operate as a separate, independent ALIP.

Still referring to FIG. 5, in some example embodiments, the induction coils 320 of separate stages 330-1, 330-2 in the multistage ALIP 120 may have different geometric properties (e.g., different geometries, or dimensions), such that independently controlling the separate stages 330-1, 330-2 of induction coils 320 may control the flow rate of liquid metal coolant 190 differently and thus may enable the multistage ALIP 120 to provide improved flexibility of control of the liquid metal coolant 190 flow rate.

For example, as shown in FIG. 5, in a multistage ALIP 120 having separate stages 330-1, 330-2 with (e.g., at least partially defined by) separate, respective sets 320-1, 320-2 of induction coils 320, the induction coils 320 in the separate sets 320-1, 320-2 (and thus at least partially defining separate stages 330-1, 330-2) may have separate, respective (e.g., different) longitudinal spacings 320-1-LS, 320-2-LS in the longitudinal direction 390 between opposing surfaces of adjacent induction coils of a same set of induction coils 320. In another example, the induction coils 320 in the separate sets 320-1, 320-2 (and thus at least partially defining separate stages 330-1, 330-2) may have separate, respective (e.g., different) induction coil longitudinal thicknesses 320-1-LT, 320-2-LT in the longitudinal direction 390. In another example, the induction coils 320 in the separate sets 320-1, 320-N (and thus at least partially defining separate stages 330-1, 330-2) may have separate, respective (e.g., different) coil radial thicknesses 320-1-RT, 320-2-RT, also referred to interchangeably herein as annular thicknesses, in a radial direction that extends perpendicular to the longitudinal direction 390. In another example, the induction coils 320 in the separate sets 320-1, 320-2 (and thus at least partially defining separate stages 330-1, 330-2) may have separate, respective (e.g., different) induction coil inner radii 320-1-IR, 320-2-IR in a radial direction that extends perpendicular to the longitudinal direction 390. In another example, the induction coils 320 in the separate sets 320-1, 320-N (and thus at least partially defining separate stages 330-1, 330-2) may have separate, respective (e.g., different) induction coil outer radii 320-1-OR, 320-2-OR in a radial direction that extends perpendicular to the longitudinal direction 390. In another example, the induction coils 320 in the separate sets 320-1, 320-N may have separate, respective (e.g., different) induction coil material compositions (e.g., copper, silver, etc.).

It will be understood that, as shown in FIG. 5, separate stages 330-1, 330-2 of the multistage ALIP may include and/or may be at least partially defined by separate, respective sets 320-1, 320-2 of induction coils 320 having at least one of, or all of, different intrinsic properties including different induction coil material composition, different spacing in the longitudinal direction between opposing surfaces of adjacent induction coils of a same set of induction coils, different induction coil thickness in the longitudinal direction, different induction coil annular thickness in a radial direction that extends perpendicular to the longitudinal direction, different induction coil inner radius, and/or different induction coil outer radius.

As shown in FIG. 5, the coil geometry and longitudinal spacing of separate stages in the multistage ALIP 120 may be varied to configure the multistage ALIP 120 to accommodate various different and specific flow regimes in different sections (e.g., different longitudinal sections 610-1, 610-2 of different stages) of the multistage ALIP 120, and where each separate longitudinal section 610-1, 610-2 may be independently controlled based on independent control of the respective set 320-1, 320-2 of induction coils 320 at least partially defining that section (e.g., via independent control and/or adjustment of the polyphase electrical power supplied to the respective set of induction coils). Independent control of each section (e.g., independent control of the induction coils 320 in each stage) may enable the multistage ALIP 120 to provide for greater operational flexibility under non steady-state flow conditions.

Figure 6:
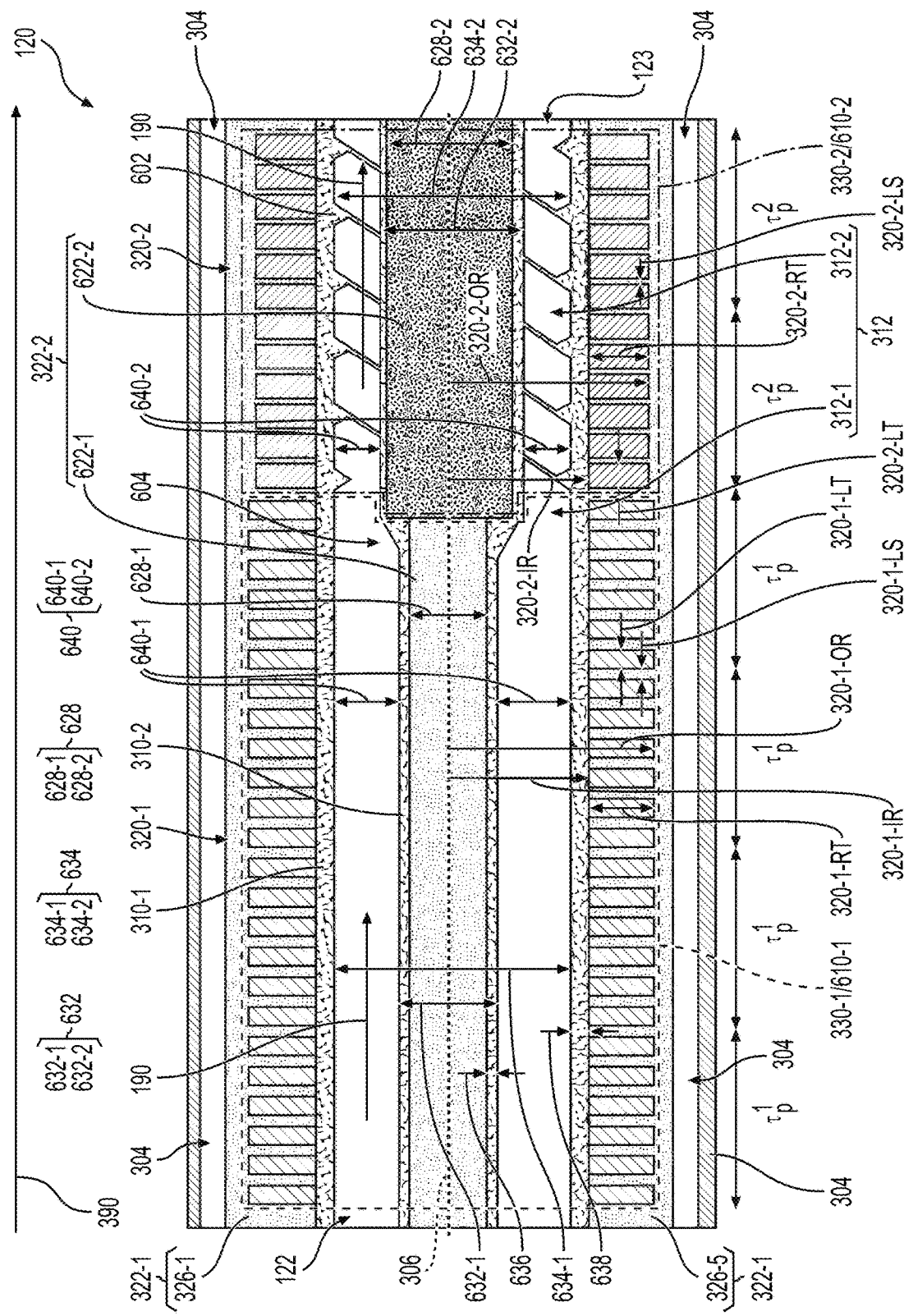
FIG. 6 is a plan side cross-sectional view of a multistage ALIP, according to some example embodiments.

FIG. 6 is a plan side cross-sectional view of a multistage ALIP, according to some example embodiments. It will be understood that a wiring diagram for the multistage ALIP of FIG. 6 may be the same as the wiring diagram shown in FIG. 3C. While some elements of the multistage ALIP 120 shown in FIGS. 3A-3C are not shown in FIG. 6 (e.g., coolant fluid inlet 382, coolant fluid outlet 384, inlet-side structure 302-1, outlet-side structure 302-2, support ribs 388, power supply conductor 180, etc.), it will be understood that the multistage ALIP 120 shown in FIG. 6 may include some, all, or none of the same structures shown in FIGS. 3A-3C (e.g., coolant fluid inlet 382, coolant fluid outlet 384, inlet-side structure 302-1, outlet-side structure 302-2, support ribs 388, inlet 122, outlet 123, power supply conductor 180, etc.).

Referring generally to FIG. 6, in some example embodiments the separate stages of a multistage ALIP 120 may be at least partially defined by variation in the longitudinal direction of at least one of a material composition of the central core 322-2, or a diameter of the central core 322-2 in a direction that is perpendicular to the longitudinal direction 390.

As shown in FIG. 6, for example, in example embodiments where the multistage ALIP 120 includes two stages 330-1, 330-2, the central core 322-2 may include multiple, separate longitudinally-separate central core sections 622-1 to 622-2 that are included in separate stages 330-1, 330-2. As shown, the separate central core sections 622-1, 622-2 may have different radii and thus different diameters 628-1, 628-2. In some example embodiments, separate central core sections 622-1, 622-2 may have a same or different material composition, with same or different diameters 628-1, 628-2, same or different outer diameters, same or different inner diameters in example embodiments where the separate core sections 622-1, 622-2 define respective central spaces 328, same or different radial or annular thicknesses of the separate core sections 622-1, 622-2, any combination thereof, or the like. For example, central core section 622-1 may comprise magnetic iron, while central core section 622-2 may comprise stainless steel.

As shown in FIG. 6, and unlike the example embodiments shown in at least FIGS. 3A and 3C, the central core 322-2 may include one or more solid cylindrical structures (e.g., separate central core sections 622-1 and 622-2 may each be a solid cylindrical structure) such that a central space 328 is absent from the multistage ALIP 120 as shown in FIG. 6. However, example embodiments are not limited thereto, and in some example embodiments one or both of the central core sections 622-1 and 622-2 may be a hollow cylindrical structure defining a central space 328 at the radial center of one or more sections 610-1 and 610-2 of the stages 330-1 and 330-2. Where both of the central core sections 622-1 and 622-2 define respective central spaces 328 at the radial center of both sections 610-1 and 610-2 of the stages 330-1 and 330-2, the central spaces 328 defined by the separate central core sections 622-1 and 622-2 may have same or different diameters.

Still referring to FIG. 6, in some example embodiments, the separate stages 330-1, 330-2 of a multistage ALIP 120 may be at least partially defined by variation in the longitudinal direction 390 of at least one of an outer diameter 632 and/or inner diameter of an inner annular wall 310-2 of the concentric annular walls 310, an inner diameter 634 and/or outer diameter of an outer annular wall 310-1 of the concentric annular walls 310, a radial thickness 636, 638 of at least one annular wall of the concentric annular walls 310, or a geometry of the flow annulus 312.

As shown in FIG. 6, the concentric annular walls 310 and the flow annulus 312 defined by the concentric annular walls 310 may be understood to at least partially define two or more separate longitudinal sections 610-1 to 610-2 of the multistage ALIP 120 that at least partially define the separate stages 330-1, 330-2 of the multistage ALIP 120. Separate longitudinal sections 610-1, 610-2 may be partially or completely encompassed within separate, respective stages 330-1, 330-2 of the multistage ALIP 120, but example embodiments are not limited thereto.

Still referring to FIG. 6, separate sections 610-1, 610-2 (also referred to herein as longitudinal sections of the multistage ALIP 120) may feature different structural geometries of the concentric annular walls 310, in addition to or separate from variations in the central core 322-2 as described herein. As a result, in some example embodiments the flow annulus 312 may have different properties in separate sections 610-1, 610-2 of the multistage ALIP 120 and may feature different flow geometries in separate stages 330-1, 330-2 of the multistage ALIP 120.

In some example embodiments, the separate sections 610-1, 610-2 may include same or different inner diameters 634-1, 634-2 of the outer annular wall 310-1 and/or same or different outer diameters 632-1, 632-2 of the inner annular wall 310-2. For example, as shown in FIG. 6, in sections 610-1, 610-2 the outer annular wall 310-1 has approximately the same inner diameter 634 in both sections 610-1, 610-2 (e.g., 634-1=634-2), but the inner annular wall 310-2 has a smaller outer diameter 632 in the section 610-1 than the outer in the section 610-2 (e.g., 632-1<632-2). As a result, the annular, or radial thickness 640 of the flow annulus 312 is a larger thickness 640-1 in the first section 610-1 than the thickness 640-2 in the second section 610-2. As a result, the cross-sectional flow area in the first section 610-1 may be larger than the cross-sectional flow area in the second section 610-2.

As further shown in FIG. 6, the outer and inner annular walls 310-1, 310-2 may have smooth opposing cylindrical sidewalls in the first section 610-1, such that the concentric annular walls 310 define a flow annulus geometry of the flow annulus 312 in the first section 610-1 (e.g., flow annulus section 312-1) that is a smooth annulus. In addition, as shown in FIG. 6, the outer annular wall 310-1 may include one or more helical projections 602 or grooves that establish a spiral or helical pattern on the inner surface of the outer annular wall 310-1 in the second section 610-1, such that the concentric annular walls 310 define a flow annulus geometry of the flow annulus 312 in the second section 610-2 (e.g., flow annulus section 312-2) that is a helical annulus. While FIG. 6 illustrates only the outer annular wall 310-1 having structural features that contribute to the helical annulus flow geometry of the flow annulus 312 in the second section 610-2, it will be understood that the inner annular wall 310-2 may additionally or alternatively include such structural features.

Still referring to FIG. 6, a transition region 604 between longitudinally adjacent sections 610-1, 610-2 may have structural features that transition in the longitudinal direction 390 between features of the first section 610-1 and features of the second section 610-2. For example, in FIG. 6, the transition region 604 includes a variation of the outer diameter 632 of the inner annular wall 310-2 between outer diameter 632-1 and outer diameter 632-2 and thus a variation in flow annulus 312 radial thickness 640, in addition to a change in central core 322-2 diameter and material composition. The longitudinal boundaries of the transition region 604 in the longitudinal direction 390 may be defined by a longitudinal boundary of a stage (e.g., as shown at the outlet-proximate longitudinal boundary of transition region 604) and/or a longitudinal boundary at which variation in one of the structural properties of the concentric annular walls 310, central core 322-2, and/or flow annulus 312 begins (e.g., as shown at the inlet-proximate longitudinal boundary of transition region 604). As further shown in FIG. 6, the transition region 604 may be understood to be included in one of the first or second sections 610-1, 610-2 and thus within one of the stages 330-1, 330-2.

Still referring generally to FIG. 6, in the first stage 330-1 that includes set 320-1 of induction coils 320-1 and further includes the first section 610-1 with a magnetic iron central core section 622-1 and concentric annular walls 310 defining a flow annulus section 312-1 having a smooth annulus flow geometry, the multistage ALIP 120 may be configured to operate and behave similarly to a single-stage ALIP wherein fluid velocity of liquid metal coolant 190 flowing through the first stage 330-1 increases in the longitudinal direction 390 from the inlet 122. In the second stage 330-2 that includes set 320-2 of induction coils and further includes the second section 610-2 with a stainless steel central core section 622-2 and concentric annular walls 310 defining a flow annulus section 312-2 having a helical annulus flow geometry, the second section 610-2 may be configured to follow a corkscrew spiral shape (e.g., helical flow geometry) that is configured to induce swirling of the liquid metal coolant 190 at the outlet 123, where the flow annulus radial thickness 640 is reduced to a smaller thickness 640-2 to bring the liquid metal coolant 190 closer to the induction coils 320 of the second stage 330-2.

In addition, as shown in FIG. 6, the induction coils 320 of set 320-2 that are included in the second stage 330-2 have an increased longitudinal thickness 320-2-LT and a reduced longitudinal spacing 320-2-LS than the coils 320 of the first stage 330-1, so that the coils 320 of the second stage 330-2 are configured to maintain a stronger magnetic field. Additionally, the stainless steel central core section 622-2 may have a weaker magnetic permeability than the magnetic iron central core section 622-1, as this may better shape the magnetic fields in the second stage to pump in the direction of swirl rather than towards the outlet 123. Swirl may be desired at the outlet 123 for cooling considerations and may not be desired at the inlet 122 in order to avoid vortex formation and cavitation for open-pool liquid metal nuclear reactors. In the multistage ALIP 120 shown in FIG. 6, including the separate sections 610-1, 610-2 partially or entirely in separate independently controllable stages 330-1, 330-2 enables the multistage ALIP 120 to be configured to enable optimization of liquid metal coolant 190 pumping and liquid metal coolant 190 swirling in each separate stage 330-1, 330-2 of the multistage ALIP 120.

Figure 7:
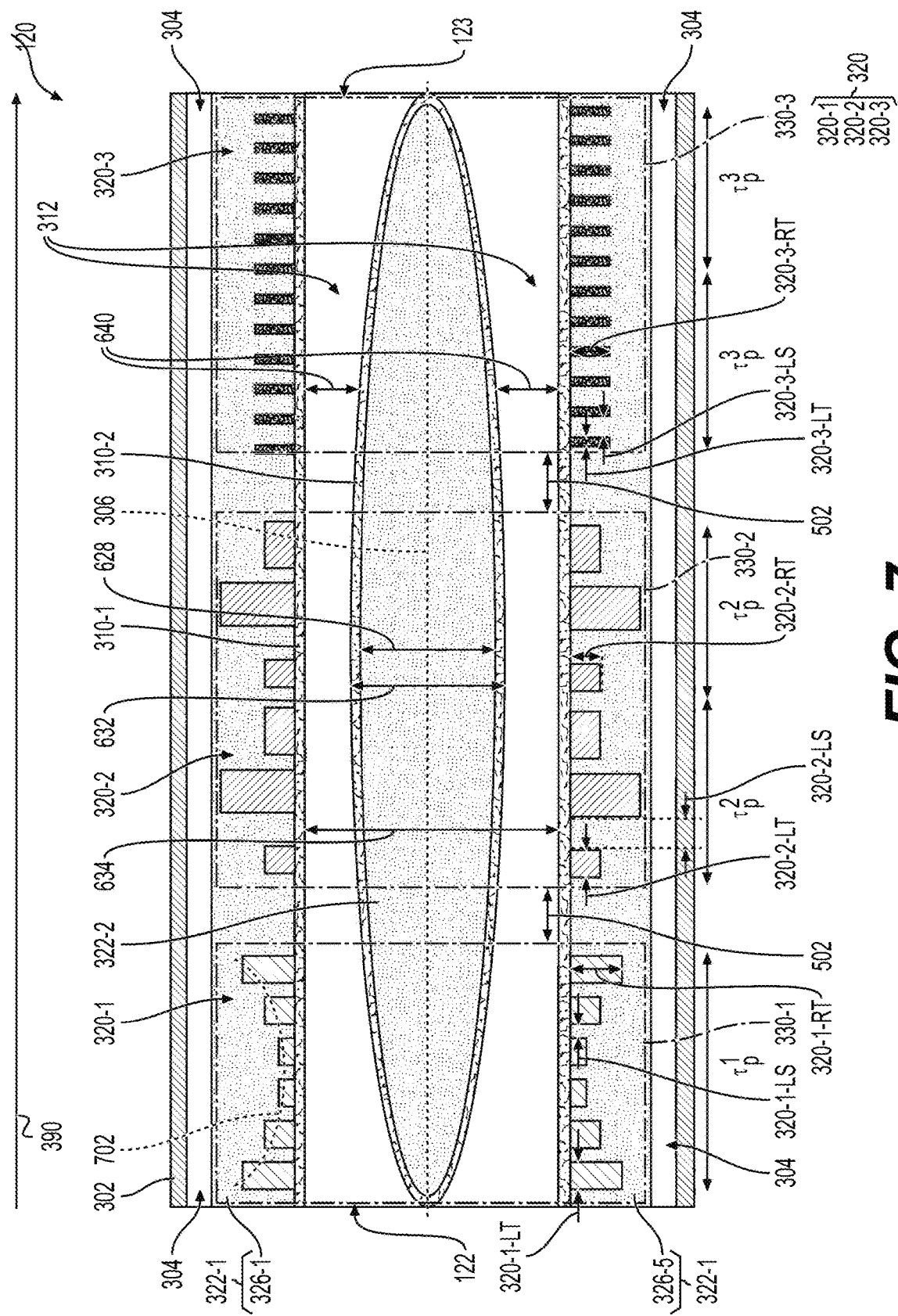
FIG. 7 is a plan side cross-sectional view of a multistage ALIP, according to some example embodiments.

FIG. 7 is a plan side cross-sectional view of a multistage ALIP, according to some example embodiments. It will be understood that a wiring diagram each stage of the multistage ALIP of FIG. 7 may be the same as the wiring diagram for any of the stages shown in FIG. 3C. While some elements of the multistage ALIP 120 shown in FIGS. 3A-3C are not shown in FIG. 7 (e.g., coolant fluid inlet 382, coolant fluid outlet 384, inlet-side structure 302-1, outlet-side structure 302-2, support ribs 388, power supply conductor 180, etc.), it will be understood that the multistage ALIP 120 shown in FIG. 7 may include some, all, or none of the same structures shown in FIGS. 3A-3C (e.g., coolant fluid inlet 382, coolant fluid outlet 384, inlet-side structure 302-1, outlet-side structure 302-2, support ribs 388, inlet 122, outlet 123, power supply conductor 180, etc.).

The multistage ALIP 120 shown in FIG. 7 is illustrated as a three-stage ALIP (e.g., a multistage ALIP 120 having N stages 330-1 to 330-N where N=3), but example embodiments are not limited thereto and the description herein with regard to any three-stage multistage ALIP 120 and any stage thereof may be applied to any multistage ALIP 120 having two or more stages (e.g., 330-1 to 330-N where N>2) and any stage thereof.

Referring generally to FIG. 7, in some example embodiments, one or more geometric and/or intrinsic properties of inductions coils 320 within a given stage of the multistage ALIP 120 may vary, between at least two induction coils 320 of the given stage, along the longitudinal direction 390 of the multistage ALIP 120. In some example embodiments, a geometric property associated with a stage may be referred to interchangeably as an intrinsic property. Such varying intrinsic properties may include variations, between at least two induction coils 320 of a given stage (e.g., at least two induction coils configured to be electrically connected to a same polyphase power supply), may include at least one of induction coil 320 material composition, spacing in the longitudinal direction 390 between opposing surfaces of adjacent induction coils 320 of a same set of induction coils, induction coil thickness in the longitudinal direction, induction coil annular thickness in a radial direction that extends perpendicular to the longitudinal direction 390, induction coil inner radius, or induction coil outer radius. Such variation may or may not approximate or conform to a mathematical function.

For example, as shown in FIG. 7, where the multistage ALIP 120 is shown to include three stages 330-1, 330-2, 330-3, the third stage 330-3 of the multistage ALIP 120 includes a third set 320-3 of induction coils 320 that have a constant radial thickness 320-3-RT, longitudinal thickness 320-3-LT, and spacing therebetween 320-3-LS.

In another example, the first stage 330-1 of the multistage ALIP 120 includes a first set 320-1 of induction coils 320 that have a constant longitudinal thickness 320-1-LT and spacing therebetween 320-1-LS but a variable radial thickness 320-1-RT that varies between longitudinally-adjacent induction coils 320 in the longitudinal direction 390. As shown, the variation in the longitudinal direction 390 of the radial thickness 320-1-RT may approximate a mathematical function, for example a parabolic function 702 that varies radial thickness of a given induction coil 320 in set 320-1 as a function of the distance in the longitudinal direction 390 of the given induction coil 320 from inlet 122 according to the shape of a parabola.

In another example, the second stage 330-2 of the multistage ALIP 120 includes a second set 320-2 of induction coils 320 having respective radial thicknesses 320-2-RT, longitudinal spacings 320-2-LS, and/or longitudinal thicknesses 320-2-LT. The variation in such thicknesses and spacings of the induction coils 320 may approximate a mathematical function based on a distance in the longitudinal direction 390 from a reference point (e.g., inlet 122) or may be arbitrary and/or random.

In addition, in some example embodiments the material compositions of induction coils 320 may vary between induction coils 320 within a given stage (e.g., configured to be electrically connected to a same polyphase power supply).

Still referring to FIG. 7, in some example embodiments, the diameter 628 of the central core 322-2 and/or the outer/inner diameter of one or more of the concentric annular walls 310 may vary continuously along the longitudinal direction 390 according to a mathematical function wherein the diameter varies as a function of the distance in the longitudinal direction 390 from a reference point (e.g., inlet 122). As shown in FIG. 7, the diameter 628 of the central core 322-2 and the outer diameter 632 of the inner annular wall 310-2 may vary according to a mathematical function of the distance in the longitudinal direction 390 from the inlet 122, while the inner diameter 634 of the outer annular wall 310-1 may be fixed, or constant, in the longitudinal direction 390, such that the radial thickness 640, and thus cross-sectional flow area, of the flow annulus 312 varies in the longitudinal direction 390 according to a mathematical function of the distance in the longitudinal direction 390 from the inlet 122.

As shown in FIG. 7, and unlike some example embodiments, including the example embodiments shown in at least FIGS. 3A and 3C, the central core 322-2 may include one or more solid cylindrical structures such that a central space 328 is absent from the multistage ALIP 120 as shown in FIG. 7. However, example embodiments are not limited thereto, and in some example embodiments the central core 322-2 may be a hollow cylindrical structure defining a central space 328 at the radial center of the multistage ALIP 120. The central space 328 may extend through the entire length of the central core 322-2 in the longitudinal direction 390, between the inlet 122 and the outlet 123, and the central space 328 may have a fixed or variable diameter along the length of the multistage ALIP 120 in the longitudinal direction 390. The central space 328 may have a fixed diameter along the length of the multistage ALIP 120 in the longitudinal direction 390, even in example embodiments where the central core 322-2 has a diameter 628 that varies along the length of the multistage ALIP 120 in the longitudinal direction 390.

As shown in FIG. 7, the multistage ALIP 120 may have longitudinal spacing distances 502 between adjacent stages 330-1, 330-2, and 330-3 (e.g., between adjacent sets 320-1, 320-2, and 320-3). The longitudinal spacing distances 502 between separate adjacent pairs of stages (e.g., spacing distance between stages 330-1 and 330-2 as defined by sets 320-1 and 320-2, spacing distance between stages 330-2 and 330-3 as defined by sets 320-2 and 320-3, etc.) may have a same magnitude in the longitudinal direction 390 or different magnitudes in the longitudinal direction 390 (e.g., sets 320-1 and 320-2 may be closer to each other or further apart in the longitudinal direction 390 than the longitudinal spacing distance 502 between sets 320-2 and 320-3 in the longitudinal direction 390).

Figure 8:
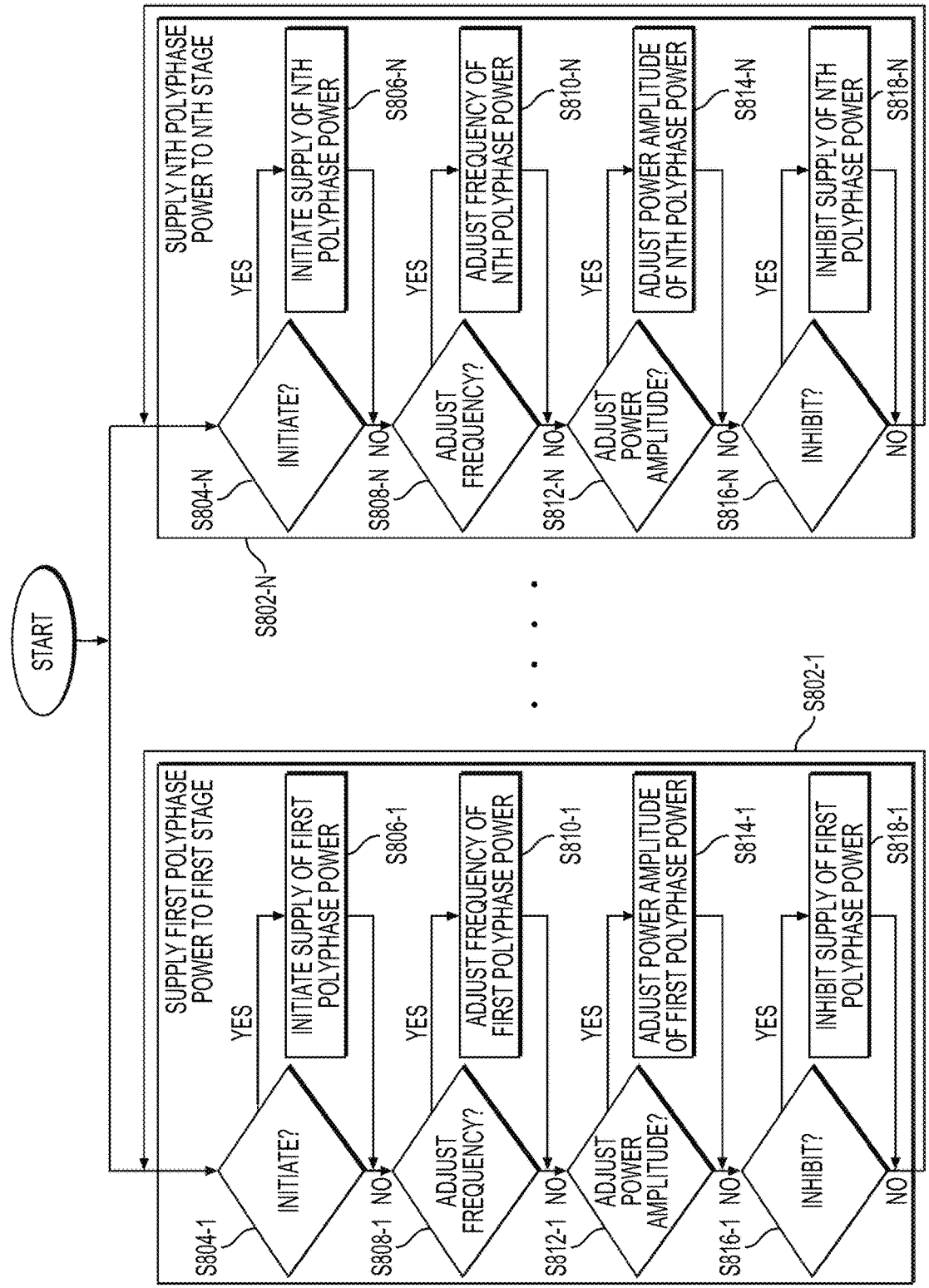
FIG. 8 is a flowchart illustrating a method for operating a multistage ALIP, according to some example embodiments.

FIG. 8 is a flowchart illustrating a method for operating a multistage ALIP, according to some example embodiments. The method shown in FIG. 8 may be implemented with regard to any multistage ALIP 120 according to any of the example embodiments. The method shown in FIG. 8 may be at least partially implemented by an EMP control system 150 such as the EMP control system 150 shown in FIG. 1 and with regard to one or more polyphase power supplies 144-1 to 144-N such as shown in FIG. 1.

As shown in FIG. 8, the method may include, at S802-1 to S802-N, for each of N stages of a multistage ALIP 120, where N is any positive integer, independently controlling and/or adjusting the supply of polyphase electric power supplied to each of the N stages of the multistage ALIP 120 from separate, respective (e.g., different) polyphase power supplies (e.g., 144-1 to 144-N).

For example, where the number N of stages is equal to or greater than 2, the method may include, at S802-1, supplying first polyphase electrical power to a first stage 330-1 of the plurality of stages of the multistage ALIP 120 via a first polyphase power supply 144-1 of the plurality of polyphase power supplies to cause liquid metal coolant 190 to flow through the flow annulus 312, and, at S802-2, independently controlling a separate supply of second polyphase electrical power to a second stage 330-2 of the plurality of stages via a second polyphase power supply 144-2 of the plurality of polyphase power supplies to adjustably control the flow of liquid metal coolant 190 through the flow annulus 312.

A description will now be provided for a single operation of independently controlling an Nth stage of the multistage ALIP 120 at S802-N, but it will be understood that the descriptions of operations S804-N to S818-N as described with regard to operation S802-N may apply equally to any of the operations of any of S802-1 to S802-N (e.g., the description of S804-N may apply to S804-1, the description of S806-N may apply to S806-1, the description of S808-N may apply to S808-1, the description of S810-N may apply to S810-1, the description of S812-N may apply to S812-1, the description of S814-N may apply to S814-1, the description of S816-N may apply to S816-1, and/or the description of S818-N may apply to S818-1).

At S804-N, operation S802-N may include determining whether to initiate (e.g., turn on) a supply of polyphase electrical power from Nth polyphase power supply 144-N to the Nth stage of the multistage ALIP 120. If so, at S806-N, a control signal may be generated and transmitted to the Nth polyphase power supply 144-N to cause the Nth polyphase power supply 144-N to initiate the supply of polyphase electrical power to the Nth stage. The control signal may be generated and transmitted by the EMP control system 150. The control signal may cause the Nth polyphase power supply 144-N to initiate a supply of polyphase electrical power having a particular (e.g., predetermined) frequency, power amplitude (e.g., voltage and/or current), phases, or the like.

At S808-N, operation S802-N includes determining whether to adjust a frequency of the polyphase electrical power supplied by the Nth polyphase power supply 144-N to the Nth stage of the multistage ALIP 120. If so, at S810-N, a control signal may be generated and transmitted to the Nth polyphase power supply 144-N to cause the Nth polyphase power supply 144-N to adjust a frequency of the supply of polyphase electrical power that is being supplied to the Nth stage. The control signal may be generated and transmitted by the EMP control system 150. The control signal may cause the Nth polyphase power supply 144-N to adjust the frequency of the supply of polyphase electrical power to a new particular frequency.

At S812-N, operation S802-N includes determining whether to adjust a power amplitude (e.g., voltage and/or current) of the polyphase electrical power supplied by the Nth polyphase power supply 144-N to the Nth stage of the multistage ALIP 120. If so, at S814-N, a control signal may be generated and transmitted to the Nth polyphase power supply 144-N to cause the Nth polyphase power supply 144-N to adjust a power amplitude (e.g., voltage and/or current] of the supply of polyphase electrical power that is being supplied to the Nth stage. The control signal may be generated and transmitted by the EMP control system 150. The control signal may cause the Nth polyphase power supply 144-N to adjust the power amplitude (e.g., voltage and/or current) of the supply of polyphase electrical power to a new particular power amplitude (e.g., voltage and/or current).

At S816-N, operation S802-N may include determining whether to inhibit (e.g., turn off) a supply of polyphase electrical power from Nth polyphase power supply 144-N to the Nth stage of the multistage ALIP 120. If so, at S818-N, a control signal may be generated and transmitted to the Nth polyphase power supply 144-N to cause the Nth polyphase power supply 144-N to inhibit the supply of polyphase electrical power to the Nth stage. The control signal may be generated and transmitted by the EMP control system 150. The control signal may cause the Nth polyphase power supply 144-N to inhibit a supply of polyphase electrical power to the Nth stage of the multistage ALIP 120.

It will be understood that any of the operations of the method shown in FIG. 8 may be performed in any order, and operations performed in any of S802-1 to S802-n may be perform in any order with respect to each other, including being performed simultaneously. For example, the method may include inhibiting a supply of the second polyphase electrical power to a second stage at S818-N while maintaining the supply of the first polyphase electrical power to the first stage (e.g., S816-1=NO). In another example, the method may include adjusting at least one of a frequency of the second polyphase electrical power that is supplied to the second stage at S810-N, independently of a frequency of the first polyphase electrical power that is supplied to the first stage, or a current of the second polyphase electrical power that is supplied to the second stage at S814-N, independently of a current of the first polyphase electrical power that is supplied to the first stage. In another example, the method may include simultaneously adjusting both the first and second polyphase electrical power supplies (e.g., any of S802-1 or S802-N) independently of each other.

It will be understood that, in some example embodiments, operations S804 to S818 of any of the operations S802-1 to S802-N may be performed independently of each other. In some example embodiments, an operation to control one of the stages of a multiage ALIP (e.g., one of S804-N to S818-N) may be performed based on an operation that is performed to another one of the stages of the multistage ALIP (e.g., one of S804-1 to S818-1). For example, in some example embodiments, a determination may be made at S808-N and S810-N to adjust a frequency of power supplied to the Nth stage in response to a determination at S816-1 to inhibit a supply of electrical power to the first stage to "turn off" the first stage of the same multistage ALIP (e.g., to switch the multistage ALIP in to a low flow-rate mode).

In some example embodiments, each of the determinations and/or operations as shown in FIG. 8 may be performed in response to receiving an input command via a user interface (e.g., keyboard, button, touchscreen, mouse, etc.) and/or communication interface (e.g., wireless network communication receiver) and/or in response to processing sensor data received from one or more sensor devices (e.g., sensor 192, which may be one or more flowmeters such as one or more Venturi flow meters that may be configured to generate sensor data indicating a flow rate of liquid metal coolant 190 through the suction line 121, return line 124, and/or multistage ALIP 120, one or more pressure sensors that may be configured to generate sensor data indicating a pressure of liquid metal coolant 190 at one or more locations in the suction line 121, return line 124, and/or multistage ALIP 120, or the like).

In some example embodiments, an adjustment of frequency and/or power amplitude of polyphase electrical power that is supplied to a stage of the multistage ALIP 120 may include determining a particular frequency and/or power amplitude and controlling a polyphase electrical power supply to cause the polyphase electrical power supply to supply polyphase electrical power having the particular frequency and/or power amplitude to the stage. The determining the particular frequency and/or power amplitude may be in response to receiving an input command that specifies a particular frequency and/or power amplitude of polyphase electrical power to be supplied to a stage and/or in response to processing sensor data received from one or more sensor devices (e.g., sensor 192, which may be one or more flowmeters such as one or more Venturi flow meters that may be configured to generate sensor data indicating a flow rate of liquid metal coolant 190 through the suction line 121, return line 124, and/or multistage ALIP 120, one or more pressure sensors that may be configured to generate sensor data indicating a pressure of liquid metal coolant 190 at one or more locations in the suction line 121, return line 124, and/or multistage ALIP 120, or the like).

The input command and/or sensor data may be processed to determine a desired or target flow rate and/or pressure rise distribution of liquid metal coolant through at least the multistage ALIP 120, an actual flow rate and/or pressure rise distribution of liquid metal coolant through at least the multistage ALIP 120 and/or primary coolant loop 119, or the like. In some example embodiments, where an actual flow rate and/or pressure rise distribution is determined based on processing sensor data, a target flow rate and/or pressure rise distribution may be determined based on comparing the actual flow rate and/or pressure rise distribution with a desired, threshold, or target flow rate and/or pressure rise distribution that may be stored in a memory and/or database. The comparing may include determining a new target flow rate and/or pressure rise distribution based on a determination that the actual flow rate and/or pressure rise distribution exceeds one or more threshold flow rates and/or pressure rise distributions.

The determining the particular frequency and/or power amplitude may include, for example in response to an input command and/or processing of received sensor data (e.g., in response to determining a desired, target, and/or actual flow rate and/or pressure rise distribution of liquid metal coolant through at least the multistage ALIP 120 and/or primary coolant loop 119, or the like), accessing an empirically-generated look-up table that associates an actual, target, and/or desired liquid metal coolant 190 flow rate and/or pressure rise distribution in the multistage ALIP with specific parameters (e.g., frequency and/or power amplitude, initiated or inhibited state, etc.) of polyphase electrical power to be supplied to one or more, or all, of the stages of a multistage ALIP to implement the associated liquid metal coolant 190 flow rate and/or pressure rise distribution. In some In some example embodiments, the look-up table may be accessed in response to receiving an input of a desired, target, and/or actual liquid metal coolant 190 flow rate and/or pressure rise distribution in the multistage ALIP 120 in order to identify specific parameters (e.g., frequency and/or power amplitude, initiated or inhibited state, etc.) of polyphase electrical power to be supplied by one or more particular polyphase power supplies to a corresponding one or more, or all, of the stages of a multistage ALIP to implement the desired and/or target liquid metal flow rate and/or pressure rise distribution. The operations S804 to S818 of any of the operations S802-1 to S802-N to implement the desired and/or target liquid metal flow rate and/or pressure rise distribution may include transmitting control signals to the one or more particular polyphase power supplies to cause the one or more particular polyphase power supplies to adjust the polyphase electrical power supplied thereby to the corresponding one or more, or all, of the stages of the multistage ALIP pursuant to the specific parameters (e.g., frequency and/or power amplitude, initiated or inhibited state, etc.) of polyphase electrical power to be supplied by one or more particular polyphase power supplies to a corresponding one or more, or all, of the stages of a multistage ALIP to implement the desired and/or target liquid metal flow rate and/or pressure rise distribution.

Figure 9:
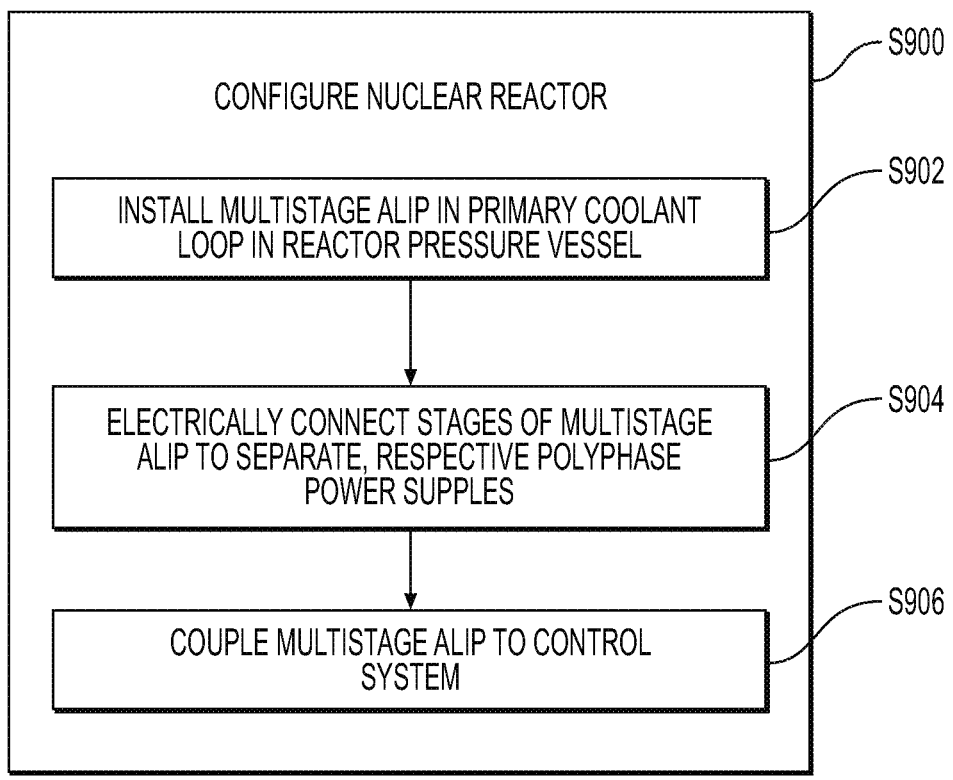
FIG. 9 is a flowchart illustrating a method for configuring a nuclear reactor to improve liquid metal coolant flow control in the nuclear reactor, according to some example embodiments.

FIG. 9 is a flowchart illustrating a method for configuring S900 a nuclear reactor to improve liquid metal coolant flow control in the nuclear reactor, according to some example embodiments. The configuring may be implemented with regard to any example embodiment of nuclear reactors included herein, including the nuclear reactor 110 illustrated in FIG. 1.

At S902, the configuring S900 may include installing a multistage ALIP 120 in a primary coolant loop 119 within the nuclear reactor pressure vessel 111. The multistage ALIP 120 may be any of the multistage ALIPs 120 according to any of the example embodiments. The installing may be implemented by a human operator. Such installing may include connecting the inlet 122 of the multistage ALIP 120 to a suction line 121 of the primary coolant loop 119 and connecting the outlet 123 of the multistage ALIP 120 to a return line 124 of the primary coolant loop 119. The installing may include connecting the pump casing 302 of the multistage ALIP 120 to a structural support member of the nuclear reactor 110, to structurally connect the multistage ALIP 120 to the nuclear reactor pressure vessel 111, the core inlet plenum 118, the nuclear reactor core 112, the primary heat exchanger 114, the suction reservoir 116, or any combination thereof.

At S904, the configuring S900 may include electrically coupling the multistage ALIP 120 to a plurality of polyphase power supplies 144-1 to 144-N corresponding to the N stages of the multistage ALIP 120, thereby electrically connecting the N stages of the multistage ALIP 120 to separate, respective power supplies of the polyphase power supplies 144-1 to 144-N. The coupling may be implemented by a human operator. The electric coupling at S904 may include electrically connecting the sets 320-1 to 320-N of induction coils 320 of the multistage ALIP 120 to separate, respective polyphase power cables 146-1 to 146-N where the separate, respective polyphase power cables 146-1 to 146-N extend through a single power supply conductor 180, or extension cord from the multistage ALIP 120 to at least an exterior of the nuclear reactor pressure vessel 111 via a single penetration 182 through the outer wall 111S of the nuclear reactor pressure vessel 111. Each of the polyphase power cables 146-1 to 146-N may be configured to connect a separate polyphase power supply 144-1 to 144-N to a separate stage of the multistage ALIP 120.

At S906, the configuring S900 may include coupling (e.g., electrically coupling and/or communicatively coupling) the multistage ALIP 120 to one or more EMP control systems. The coupling may be implemented by a human operator. The coupling may include communicatively coupling the multistage ALIP 120 to one or more portions of the EMP control system 150 via one or more communication lines, electrically coupling power supplies 144-1 to 144-N to the EMP control system 150, thereby indirectly communicatively coupling the EMP control system 150 to the multistage ALIP 120 via the polyphase power supplies 144-1 to 144-N via one or more communication lines, power lines, etc. The EMP control system 150 may include a memory (e.g., a solid state drive or SSD) storing a program of instructions and a processor (e.g. a central processor unit or CPU) configured to execute the program of instructions to independently control each stage of the plurality of stages based on independently controlling polyphase electrical power supplied by the separate, respective polyphase power supplies 144-1 to 144-N).

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims. In addition, while processes have been disclosed herein, it should be understood that the described elements of the processes may be implemented in different orders, using different selections of elements, some combination thereof, etc. For example, some example embodiments of the disclosed processes may be implemented using fewer elements than that of the illustrated and described processes, and some example embodiments of the disclosed processes may be implemented using more elements than that of the illustrated and described processes.

The invention claimed is:

1. A nuclear reactor configured to be cooled via liquid metal circulation, the nuclear reactor comprising:
   a reactor pressure vessel;
   a reactor core within the reactor pressure vessel; and
   a multistage annular linear induction pump (ALIP) within the reactor pressure vessel, the multistage ALIP configured to circulate liquid metal coolant through a primary coolant flow path that includes the reactor core, the multistage ALIP including
      a pump casing having a longitudinal axis extending in a longitudinal direction, the pump casing at least partially defining an interior of the multistage ALIP,
      concentric annular walls extending coaxially with the longitudinal axis and collectively defining a flow annulus extending coaxially with the longitudinal axis, and
      a plurality of induction coils within the interior of the multistage ALIP, each induction coil surrounding the longitudinal axis, the plurality of induction coils each having a central axis that is coaxial with the longitudinal axis, the plurality of induction coils spaced apart from each other in the longitudinal direction, the plurality of induction coils including a plurality of sets of induction coils, the plurality of sets of induction coils at least partially defining separate, respective stages of a plurality of stages of the multistage ALIP, the plurality of sets of induction coils configured to be electrically connected to separate, respective polyphase power supplies of a plurality of polyphase power supplies, such that the plurality of stages are configured to be controlled independently of each other to adjustably control a flow of liquid metal coolant through the primary coolant flow path based on independent control of the plurality of polyphase power supplies.

2. The nuclear reactor of claim 1, wherein
the plurality of sets of induction coils includes a first set of induction coils and a second set of induction coils, the first set of induction coils at least partially defining a first stage of the plurality of stages, the second set of induction coils at least partially defining a second stage of the plurality of stages, and
the first and second sets of induction coils are at least partially interlaced with each other in the longitudinal direction, such that at least one induction coil of the first set of induction coils is located between at least two induction coils of the second set of induction coils in the longitudinal direction.

3. The nuclear reactor of claim 1, wherein
the plurality of sets of induction coils includes a first set of induction coils and a second set of induction coils,
the first set of induction coils at least partially defining a first stage of the plurality of stages, the second set of induction coils at least partially defining a second stage of the plurality of stages, and
the first and second sets of induction coils are spaced apart from each other in the longitudinal direction, such that
no induction coil of the first set of induction coils is located between at least two induction coils of the second set of induction coils in the longitudinal direction, and
no induction coil of the second set of induction coils is located between at least two induction coils of the first set of induction coils in the longitudinal direction.

4. The nuclear reactor of claim 1, wherein
the plurality of sets of induction coils includes a first set of induction coils and a second set of induction coils,
the first set of induction coils at least partially defining a first stage of the plurality of stages, the second set of induction coils at least partially defining a second stage of the plurality of stages, and
the first and second sets of induction coils have different intrinsic properties, said different intrinsic properties including at least one of
induction coil material composition,
spacing in the longitudinal direction between opposing surfaces of adjacent induction coils of a same set of induction coils,
induction coil thickness in the longitudinal direction,
induction coil annular thickness in a radial direction that extends perpendicular to the longitudinal direction,
induction coil inner radius, or
induction coil outer radius.

5. The nuclear reactor of claim 1, wherein
at least two induction coils of a given set of induction coils of the plurality of sets of induction coils have different intrinsic properties, said different intrinsic properties including at least one of
induction coil material composition,
spacing in the longitudinal direction between opposing surfaces of adjacent induction coils of a same set of induction coils,
induction coil thickness in the longitudinal direction,
induction coil annular thickness in a radial direction that extends perpendicular to the longitudinal direction,
induction coil inner radius, or
induction coil outer radius.

6. The nuclear reactor of claim 1, wherein
the multistage ALIP further includes a central core extending coaxially to the longitudinal axis and surrounded by the concentric annular walls,
the plurality of stages are further at least partially defined by variation in the longitudinal direction of at least one of
a material composition of the central core in a region bounded by one or more induction coils in a radial direction that is perpendicular to the longitudinal direction, or
a diameter of the central core in a radial direction that is perpendicular to the longitudinal direction in a region bounded by one or more induction coils in the radial direction.

7. The nuclear reactor of claim 1, wherein
the plurality of stages are further at least partially defined by variation in the longitudinal direction of at least one of
an outer diameter of an inner annular wall of the concentric annular walls,
an inner diameter of an outer annular wall of the concentric annular walls,
a radial thickness of at least one annular wall of the concentric annular walls, or
a geometry of the flow annulus.

8. The nuclear reactor of claim 1, wherein
each separate polyphase power supply is configured to supply polyphase electrical power via a separate polyphase power cable of a plurality of polyphase power cables,
the plurality of sets of induction coils are electrically connected to separate, respective polyphase power cables of the plurality of polyphase power cables,
the plurality of polyphase power cables are at least partially enclosed within a single power supply conductor cable, and
the single power supply conductor cable extends between at least the casing of the multistage ALIP and at least an exterior of the reactor pressure vessel via a single opening in an outer wall of the reactor pressure vessel, so that the plurality of sets of induction coils are electrically coupled to separate, respective polyphase power supplies via the single opening in the outer wall of the reactor pressure vessel.

9. The nuclear reactor of claim 1, further comprising:
a control system configured to independently control the plurality of polyphase power supplies to independently control supplies of polyphase electrical power to each stage of the plurality of stages of the multistage ALIP, to adjustably control the flow of the liquid metal coolant through the primary coolant flow path.

10. A multistage annular linear induction pump (ALIP) configured to circulate a liquid metal, the multistage ALIP comprising:
a pump casing having a longitudinal axis extending in a longitudinal direction, the pump casing at least partially defining an interior of the multistage ALIP;
concentric annular walls extending coaxially with the longitudinal axis and collectively defining a flow annulus extending coaxially with the longitudinal axis; and
a plurality of induction coils within the interior of the multistage ALIP, each induction coil surrounding the longitudinal axis, the plurality of induction coils each having a central axis that is coaxial with the longitudinal axis, the plurality of induction coils spaced apart from each other in the longitudinal direction, the plurality of induction coils including a plurality of sets of induction coils, the plurality of sets of induction coils at least partially defining separate, respective stages of a plurality of stages of the multistage ALIP, the plurality of sets of induction coils configured to be electrically connected to separate, respective polyphase power supplies of a plurality of polyphase power supplies, such that the plurality of stages are configured to be controlled independently of each other to adjustably control a flow of the liquid metal through the flow annulus based on independent control of the plurality of polyphase power supplies.

11. The multistage ALIP of claim 10, wherein
the plurality of sets of induction coils includes a first set of induction coils and a second set of induction coils, the first set of induction coils at least partially defining a first stage of the plurality of stages, the second set of induction coils at least partially defining a second stage of the plurality of stages, and
the first and second sets of induction coils are at least partially interlaced with each other in the longitudinal direction, such that at least one induction coil of the first set of induction coils is located between at least two induction coils of the second set of induction coils in the longitudinal direction.

12. The multistage ALIP of claim 10, wherein
the plurality of sets of induction coils includes a first set of induction coils and a second set of induction coils, the first set of induction coils at least partially defining a first stage of the plurality of stages, the second set of induction coils at least partially defining a second stage of the plurality of stages, and
the first and second sets of induction coils are spaced apart from each other in the longitudinal direction, such that
no induction coil of the first set of induction coils is located between at least two induction coils of the second set of induction coils in the longitudinal direction, and
no induction coil of the second set of induction coils is located between at least two induction coils of the first set of induction coils in the longitudinal direction.

13. The multistage ALIP of claim 10, wherein
the plurality of sets of induction coils includes a first set of induction coils and a second set of induction coils, the first set of induction coils at least partially defining a first stage of the plurality of stages, the second set of induction coils at least partially defining a second stage of the plurality of stages, and
the first and second sets of induction coils have different intrinsic properties, said different intrinsic properties including at least one of
induction coil material composition,
spacing in the longitudinal direction between opposing surfaces of adjacent induction coils of a same set of induction coils,
induction coil thickness in the longitudinal direction,
induction coil annular thickness in a radial direction that extends perpendicular to the longitudinal direction,
induction coil inner radius, or
induction coil outer radius.

14. The multistage ALIP of claim 10, wherein
at least two induction coils of a given set of induction coils of the plurality of sets of induction coils have different intrinsic properties, said different intrinsic properties including at least one of
induction coil material composition,
spacing in the longitudinal direction between opposing surfaces of adjacent induction coils of a same set of induction coils,
induction coil thickness in the longitudinal direction,
induction coil annular thickness in a radial direction that extends perpendicular to the longitudinal direction,
induction coil inner radius, or
induction coil outer radius.

15. The multistage ALIP of claim 10, wherein
the multistage ALIP further includes a central core extending coaxially to the longitudinal axis and surrounded by the concentric annular walls,
the plurality of stages are further at least partially defined by variation in the longitudinal direction of at least one of
a material composition of the central core in a region bounded by one or more induction coils in a radial direction that is perpendicular to the longitudinal direction, or
a diameter of the central core in a radial direction that is perpendicular to the longitudinal direction in a region bounded by one or more induction coils in the radial direction.

16. The multistage ALIP of claim 10, wherein
the plurality of stages are further at least partially defined by variation in the longitudinal direction of at least one of
an outer diameter of an inner annular wall of the concentric annular walls,
an inner diameter of an outer annular wall of the concentric annular walls,
a radial thickness of at least one annular wall of the concentric annular walls, or
a geometry of the flow annulus.

17. A method for operating the multistage ALIP of claim 10, the method comprising:
supplying first polyphase electrical power to a first stage of the plurality of stages via a first polyphase power supply of the plurality of polyphase power supplies to cause a flow of liquid metal through the flow annulus; and
independently controlling a separate supply of second polyphase electrical power to a second stage of the plurality of stages via a second polyphase power supply of the plurality of polyphase power supplies to adjustably control the flow of liquid metal through the flow annulus.

18. The method of claim 17, wherein the independently controlling includes inhibiting the separate supply of the second polyphase electrical power to the second stage while maintaining the supplying of the first polyphase electrical power to the first stage.

19. The method of claim 17, wherein the independently controlling includes independently adjusting at least one of
a frequency of the second polyphase electrical power that is supplied to the second stage, independently of a frequency of the first polyphase electrical power that is supplied to the first stage, or
a current of the second polyphase electrical power that is supplied to the second stage, independently of a current of the first polyphase electrical power that is supplied to the first stage.

20. A method for configuring a nuclear reactor to improve liquid metal coolant flow control in the nuclear reactor, the method comprising:
installing the multistage ALIP of claim 10 in a primary coolant loop in a nuclear reactor pressure vessel of the nuclear reactor;

electrically connecting the plurality of stages of the multistage ALIP to the separate, respective polyphase power supplies via separate, respective polyphase power cables; and communicatively coupling the multistage ALIP to an electromagnetic pump control system, the electromagnetic pump control system including a memory storing a program of instructions and a processor configured to execute the program of instructions to independently control each stage of the plurality of stages based on independently controlling polyphase electrical power supplied by the separate, respective polyphase power supplies.

\* \* \* \* \*